United States Patent
Marcial et al.

(10) Patent No.: US 6,873,972 B1
(45) Date of Patent: Mar. 29, 2005

(54) SYSTEMS AND METHODS FOR CREDIT LINE MONITORING

(75) Inventors: William Marcial, Stamford, CT (US); Vinay Mahajan, Stamford, CT (US)

(73) Assignee: General Electric Company, Schenectady, NY (US)

(*) Notice: Subject to any disclaimer, the term of this patent is extended or adjusted under 35 U.S.C. 154(b) by 576 days.

(21) Appl. No.: 09/630,061

(22) Filed: Aug. 1, 2000

(51) Int. Cl.⁷ .............................................. G06F 17/60
(52) U.S. Cl. ...................................... 705/35; 707/100
(58) Field of Search ....................... 705/30–40, 42–44, 705/75–79; 707/3–7, 100–104; 713/200, 202

(56) References Cited

U.S. PATENT DOCUMENTS

| | | | |
|---|---|---|---|
| 5,025,138 A | | 6/1991 | Cuervo |
| 5,274,547 A | | 12/1993 | Zoffel et al. |
| 5,465,206 A | * | 11/1995 | Hilt et al. .................... 364/406 |
| 5,611,052 A | | 3/1997 | Dykstra et al. |
| 5,878,403 A | | 3/1999 | DeFrancesco et al. |
| 5,930,776 A | | 7/1999 | Dykstra et al. |
| 6,029,149 A | | 2/2000 | Dykstra et al. |
| 6,088,686 A | | 7/2000 | Walker et al. |
| 6,112,190 A | | 8/2000 | Fletcher et al. |
| 6,119,103 A | * | 9/2000 | Basch et al. ................... 705/35 |
| 6,128,602 A | * | 10/2000 | Northington et al. ......... 705/35 |
| 6,154,729 A | * | 11/2000 | Cannon et al. ................ 705/35 |
| 6,202,053 B1 | | 3/2001 | Christiansen et al. |
| 6,208,979 B1 | | 3/2001 | Sinclair |
| 6,267,292 B1 | * | 7/2001 | Walker et al. .............. 235/379 |
| 6,311,169 B2 | | 10/2001 | Duhon |
| 6,317,727 B1 | | 11/2001 | May |

FOREIGN PATENT DOCUMENTS

JP  55078377 A  *  6/1980  ........... G06F/15/30

OTHER PUBLICATIONS

Software Revolutionizes Customer Data at Norwest, Jan. 25, 1990, American Banker, p. 3, ISSN: 0002–7561.*

* cited by examiner

Primary Examiner—James P. Trammell
Assistant Examiner—Mary Cheung
(74) Attorney, Agent, or Firm—Armstrong Teasdale LLP

(57) ABSTRACT

In one embodiment, the present invention is a method and a system for tracking bank credit lines and borrowing. The method involves tracking credit ratings of a bank, requesting the bank to establish a line of credit, accessing a centralized database to obtain and maintain information regarding the line of credit, automatically transmitting domestic and international wire information for cash movement to the bank, and finally posting borrowing journal entries to a general ledger for financial monitoring, reporting and auditing purposes. The method and the system are capable of handling multi-currency transactions involving domestic and international banks.

44 Claims, 32 Drawing Sheets

| | | Function Name 232 | Function Description 234 | Function Dependencies 236 |
|---|---|---|---|---|
| 150 | 1.00 | Credit Line Module | | |
| 240 | 1.01 | Login | Login process and security checks | N/A |
| 250 | 1.02 | Maintain State / Country Type | Add, update, delete, view valid state / country types | N/A |
| 254 | 1.03 | Maintain Basis Type | Add, update, delete, view valid basis types | N/A |
| 256 | 1.04 | Maintain Bank Rating | Add, update, delete, view valid bank ratings | N/A |
| 258 | 1.05 | Maintain Credit Line Type | Add, update, delete, view valid credit line types | N/A |
| 264 | 1.06 | Maintain Payment Type | Add, update, delete, view valid commitment fee payment types | N/A |
| 270 | 1.07 | Maintain Bank | Add, update, view bank information | Maintain State Type Maintain Bank Rating |
| 284 | 1.08 | Change Bank Rating History | Updates bank rating for a specific bank | Maintain Bank |
| 290 | 1.09 | Maintain Bank Contact | Add, update, view bank contact information | Maintain Bank |
| 294 | 1.10 | Maintain Commitment Fee | Add, view default credit line commitment fees by originator | N/A |
| 298 | 1.11 | Add Credit Line Contract | Add, view new credit line contract | Maintain Bank Maintain Basis Type Maintain Credit Line Type Maintain Payment Type Maintain Commit Fee |
| 302 | 1.12 | Amend Credit Line Contract | Amend, view credit line contract | Add Credit Line Contract |
| 308 | 1.13 | Cancel Credit Line Contract | Terminate, view credit line contract | Add Credit Line Contract |
| 312 | 1.14 | Extend Credit Line Contract | Extend the termination date on credit line contract | Add Credit Line Contract |
| 320 | 1.15 | Change Maturity Type | Change the maturity type of a contract | Add Credit Line Contract |
| 324 | 1.16 | Merge Credit Line Contract | Transfer credit line contract and borrowings to a merged or acquiring bank | Add Credit Line Contract |

FIG. 6

| | | | |
|---|---|---|---|
| 328 ⁄1.17 | Update Notes | Update credit line contract notes | Add Credit Line Contract |
| 330 ⁄1.18 | Generate Credit Line Detail Report by Bank | Lists credit line information by bank | N/A |
| 334 ⁄1.19 | Generate Credit Line Detail Report by Expiration | Lists credit line information by termination date | N/A |
| 340 ⁄1.20 | Generate GECC/GE Credit Lines Ranking Report | Lists GECC and GE originated credit lines by total credit line amount | N/A |
| 344 ⁄1.21 | Generate GECC Credit Lines Report | Analyzes GECC credit line types by total line for domestic and international banks, total fee in US$ and fee in basis points | N/A |
| 350 ⁄1.22 | Generate GECS Credit Lines Report | Analyzes GECS credit line types by total Line for domestic and international banks, Total fee in US$ and fee in basis points | N/A |
| 354 ⁄1.23 | Generate GECC Ratings Report | Analyzes GECC's Credit Lines by bank rating | N/A |
| 360 ⁄1.24 | Generate Credit Line Accrual Report by Bank Name | Lists fee accrual information by bank name | N/A |
| 364 ⁄1.25 | Generate Credit Line Accrual Report by Pay Type | Lists fee accrual information by payment type | N/A |
| 370 ⁄1.26 | Generate Credit Line Payment Report | Lists fee payment information | N/A |
| 374 ⁄1.27 | Generate Gateway ACH Report | Lists ACH fee payment information | Generate Credit Line Payment Report |
| 380 ⁄1.28 | Generate Gateway ACH File | Creates ACH fee payment file for submission to the bank wire system | Generate Credit Line Payment Report |
| 384 ⁄1.29 | Generate Gateway Wire Report | Lists Fed wire fee payment information | Generate Credit Line Payment Report |
| 390 ⁄1.30 | Generate Gateway Wire File | Creates wire fee payment file for submission to the bank wire system | Generate Credit Line Payment Report |

FIG. 7

| | | | | |
|---|---|---|---|---|
| 160 | 2.00 | Borrowing Module | | |
| 400 | 2.01 | Maintain Currency Type | Add, update, delete, view valid currency types | N/A |
| 404 | 2.02 | Maintain Available Currency | Add, delete, view valid currency types for a credit line contract | Maintain Currency Type |
| 408 | 2.03 | Maintain Currency Exchange Rate | Add, delete, view valid currency exchange rates | Maintain Currency Type |
| 412 | 2.04 | Maintain Borrowing Spread | Add, delete, view valid borrowing spread | Maintain Credit Line Type |
| 416 | 2.05 | Maintain Benchmark Description | Add, update, delete, view valid benchmark descriptions | N/A |
| 420 | 2.06 | Maintain Benchmark Rate | Add, delete, view valid benchmark rates | Maintain Benchmark Description |
| 424 | 2.07 | Maintain Fed Funds Rate | Add, delete, view valid fed funds rates | N/A |
| 428 | 2.08 | Add Borrowing | Add, view new borrowing | Maintain Available Currency<br>Maintain Currency Exchange Rate<br>Maintain Borrowing Spread<br>Maintain Benchmark Rate<br>Maintain Fed Funds Rate |
| 432 | 2.09 | Delete Borrowing | Delete, view borrowing | Add Borrowing |
| 436 | 2.10 | Add Repayment | Add, view repayments | Add Borrowing |
| 440 | 2.11 | Generate Borrowing Detail Report by Due Date | Lists borrowing information by due date | N/A |
| 444 | 2.12 | Generate Borrowing Detail Report by Expiration | Lists borrowing information by termination date | N/A |
| 448 | 2.13 | Generate Borrowing Detail Report by state / county | Lists borrowing information by state/country | N/A |
| 452 | 2.14 | Generate Borrowing Detail Report by Unused Credit Line | Lists borrowing information by unused credit line | N/A |
| 456 | 2.15 | Generate Borrowing Detail Report by Value Date | Lists borrowing information by value date | N/A |
| 460 | 2.16 | Generate Capacity Available Report by Bank | Lists unused amount of each credit line contract by bank name | N/A |
| 464 | 2.17 | Generate Borrowings Repayment Report | Lists repayment information by bank name within currency within payment type | N/A |
| 468 | 2.18 | Generate Brrowings Interest Paid Report by Currency | Lists interest paid by bank name within due date within currency within borrower | N/A |
| 472 | 2.19 | Generate Borrowings Domestic ACH Report | Lists principal, interest and total payment information by model id within transfer type | N/A |
| 476 | 2.20 | Generate Borrowings Domestic Wire Report | Lists principal, interest and total payment information by model id within transfer type | N/A |
| 480 | 2.21 | Generate Borrowings Interest Accrual Report In Local Currency | Lists interest accrual Information by due date within currency within borrower | N/A |
| 484 | 2.22 | Generate Composite Rate Report | Lists interest expense, ending balance, average balance and average rate by currency within borrower | N/A |

FIG. 8

| | | | | |
|---|---|---|---|---|
| 170 — 3.00 | Journal Entry Module | | | |
| 488 — 3.01 | Maintain Cross Reference | Provides journal entry information | N/A | |
| 492 — 3.02 | Select Transactions | Selects principal draw down, principal repayment, interest payment and interest accrual transactions for journalization | Maintain Cross Reference | |
| 496 — 3.03 | Preview Transactions | Views the selected transactions | N/A | |
| 500 — 3.04 | Delete Transactions | Deletes transactions from the transaction file. | N/A | |
| 504 — 3.05 | Create Journal Entries | Uses the transaction records to create journal entries | Select transactions | |
| 508 — 3.06 | Preview Journal Entries | Views the journal entries | N/A | |
| 512 — 3.07 | Export Journal Entries | Loads journal entries into test file on the 'C' drive | Create Journal Entries | |
| 516 — 3.08 | Delete Journal Entries | Deletes the journal entries from the journal entry file | N/A | |
| 520 — 3.09 | View JE Text File | Views the journal entries in the text file | N/A | |

Generate Credit Line Detail Report by Expiration

GECC Credit Lines Report By Expiration

Preview

Credit Line Detail Report By Expiration
As Of: 12/31/99

CONFIDENTIAL
Run Date: 1/5/2000  8:27:13AM

| BK Code | Bank Name | CL Type | GE | Available to ($MM) GECC | GECS | Fee | Termination Date | Notes |
|---|---|---|---|---|---|---|---|---|
| ABK | A BANK | 1E | 0 | 60 | 0 | 6.00 | 12/31/99 | |
| BBK | B BANK | 1E | 0 | 200 | 0 | 6.00 | 1/1/00 | |
| CBK | C BANK | 1E | 0 | 300 | 250 | 6.00 | 1/01/00 | |
| DBK | D BANK | 1E | 0 | 200 | 0 | 6.00 | 2/29/00 | |
| EBK | E BANK | 1E | 0 | 30 | 0 | 6.00 | 2/29/00 | |
| FBK | F BANK | 1E | 0 | 75 | 0 | 6.00 | 3/01/00 | CHANGED NAME FROM F BANK |
| GBK | G BANK | 1E | 0 | 60 | 0 | 6.00 | 3/01/00 | |
| Count: | 7 | | | | | | | |
| *Total ($MM): | | | 0 | 925 | 250 | | | |
| KBK | K BANK | 1R | 0 | 100 | 0 | 6.00 | 12/31/99 | INCREASED FROM $60MM; EXTENDED TO 12/31/99 |
| LBK | L BANK | 1R | 0 | 200 | 250 | 6.00 | 1/1/00 | BOUGHT BY N BANK; CALLED BANK AM; EXTEND 1/99, DOC |
| MBK | M BANK | 1R | 0 | 470 | 0 | 6.00 | 1/01/00 | EXTENDED FOR 364 DAYS OF 2/1/99 |
| NBK | N BANK | 1R | 0 | 400 | 0 | 6.00 | 2/29/00 | EXTENDED 364-DAY FOR ADOL'N ONE YEAR |
| OBK | O BANK | 1R | 0 | 366 | 0 | 6.00 | 2/29/00 | EXTENDED 364-DAY ON 4/1/99, DOCS RECEIVED |
| PBK | P BANK | 1R | 0 | 60 | 0 | 6.00 | 2/29/00 | EXTENDED FOR 364-DAYS; NAME CHANGED FROM P BANK |
| QBK | Q BANK | 1R | 0 | 250 | 0 | 6.00 | 3/01/00 | EXTENDED 364-DAY REVOLVER FOR ADOL'N YR ON 4/1/99 |
| RBK | R BANK | 1R | 0 | 600 | 500 | 6.00 | 3/01/00 | EXTENDED 364-DAYS AS ON 3/31/99 PER OUR REQUEST |
| SBK | S BANK | 1R | 0 | 300 | 0 | 6.00 | 3/12/00 | EXTENDED 364-DAY LINE; DOCS REQUIRED (3/25/99) |
| TBK | T BANK | 1R | 0 | 250 | 0 | 6.00 | 3/13/00 | EXTENDED 364-DAY LINE TO 3/13/2000 |
| UBK | U BANK | 1R | 0 | 76 | 0 | 6.00 | 3/16/00 | EXTENDED 364-DAY LINE TO 3/16/2000 |
| VBK | V BANK | 1R | 0 | 200 | 0 | 6.00 | 3/25/00 | RENEWED ON 3/27/2000, DOCS RECEIVED |
| WBK | W BANK | 1R | 0 | 500 | 0 | 6.00 | 3/29/00 | N BANK LINE CONVERTED TO 80A; EXTENDED ON 3/20/99 |
| XBK | X BANK | 1R | 290 | 290 | 290 | 6.00 | 4/07/00 | SPECIAL PURPOSE Y2K CREDIT LINE |
| YBK | Y BANK | 1R | 10 | 10 | 10 | 6.00 | 4/07/00 | SPECIAL PURPOSE Y2K CREDIT LINE |
| ZBK | Z BANK | 1R | 120 | 120 | 120 | 6.00 | 4/07/00 | SPECIAL PURPOSE Y2K CREDIT LINE |

Generate GECC/GE Credit Lines Ranking Report

GECC/GE Credit Lines Ranking As of  12/31/1999   ($MM)

|  | Bank Name | Total | Originated By GECC | GE | FYI Total Multiyear |
|---|---|---|---|---|---|
| 1 | A BANK | 2,200 | 2,200 | 200 | 800 |
| 2 | B BANK | 2,000 | 1,600 | 400 | 350 |
| 3 | C BANK | 1,700 | 1,100 | 600 | 300 |
| 4 | D BANK | 1,400 | 1,150 | 250 | 250 |
| 5 | E BANK | 1,255 | 905 | 350 | 100 |
| 6 | F BANK | 1,200 | 950 | 250 | 0 |
| 7 | G BANK | 1,130 | 880 | 250 | 0 |
| 8 | H BANK | 970 | 820 | 150 | 250 |
| 9 | I BANK | 930 | 730 | 200 | 300 |
| 10 | J BANK | 930 | 680 | 200 | 0 |
| 11 | K BANK | 800 | 600 | 200 | 325 |
| 12 | L BANK | 725 | 725 | 0 | 350 |
| 13 | M BANK | 700 | 700 | 0 | 230 |
| 14 | N BANK | 670 | 670 | 0 | 200 |
| 15 | O BANK | 670 | 570 | 100 | 200 |
| 16 | P BANK | 670 | 670 | 0 | 0 |
| 17 | Q BANK | 640 | 640 | 0 | 50 |
| 18 | R BANK | 600 | 600 | 0 | 500 |
| 19 | S BANK | 600 | 600 | 0 | 213 |
| 20 | T BANK | 540 | 540 | 0 | 85 |
| 21 | U BANK | 530 | 430 | 100 | 300 |
| 22 | V BANK | 530 | 430 | 50 | 250 |
| 23 | W BANK | 525 | 425 | 100 | 100 |

General Credit Line Accrual Report By Bank Name

Credit Line Accrual Report
1 of 7    Preview    100%    Re-Run Report

CONFIDENTIAL
Run Date: 2/5/2000    6:14:53 PM

Credit Line Accrual Report
10/1/99 - 12/31/99

| Bank Name | Pay Type | CF Code | Accrual | Credit Line | Fee | Days | Calculation Method | Effective Date | Termination Date |
|---|---|---|---|---|---|---|---|---|---|
| A BANK | W | 826 | 88,767.12 | 600,000,000.00 | 6.00 | 90 | Actual / Actual | 12/30/96 | 12/29/99 |
| B BANK | W | 826 | 1,972.60 | 600,000,000.00 | 6.00 | 2 | Actual / Actual | 12/30/99 | 12/26/00 |
| C BANK | W | 826 | 37,435.62 | 280,000,000.00 | 8.00 | 61 | Actual / Actual | 11/01/99 | 4/07/00 |
| D BANK | A | 095 | 1,336.99 | 10,000,000.00 | 8.00 | 61 | Actual / Actual | 11/01/99 | 4/07/00 |
| E BANK | A | 095 | 6,301.37 | 25,000,000.00 | 10.00 | 92 | Actual / Actual | 12/12/97 | 12/12/00 |
| F BANK | W | 827 | 25,205.45 | 100,000,000.00 | 10.00 | 92 | Actual / Actual | 6/06/99 | 6/06/00 |
| G BANK | W | 825 | 25,205.45 | 100,000,000.00 | 10.00 | 92 | Actual / Actual | 1/31/97 | 1/31/00 |
| H BANK | W | 848 | 10,246.58 | 200,000,000.00 | 6.00 | 31 | Actual / Actual | 6/01/99 | 5/30/00 |
| I BANK | W | 848 | 16,843.84 | 120,000,000.00 | 8.00 | 61 | Actual / Actual | 11/01/99 | 4/07/00 |
| J BANK | W | 848 | 31,806.85 | 100,000,000.00 | 12.50 | 92 | Actual / Actual | 6/01/99 | 6/01/00 |
| K BANK | A | 135 | 12,602.74 | 50,000,000.00 | 10.00 | 92 | Actual / Actual | 6/30/99 | 6/30/00 |
| L BANK | A | 024 | 4,010.96 | 30,000,000.00 | 8.00 | 61 | Actual / Actual | 11/01/99 | 4/07/00 |
| M BANK | W | 848 | 1,369.86 | 100,000,000.00 | 10.00 | 6 | Actual / Actual | 12/27/99 | 12/31/00 |
| N BANK | A | 024 | 23,836.62 | 100,000,000.00 | 10.00 | 67 | Actual / Actual | 11/01/99 | 12/26/00 |
| O BANK | A | 024 | 16,123.29 | 100,000,000.00 | 6.00 | 92 | Actual / Actual | 1/04/99 | 12/31/00 |
| P BANK | A | 004 | 16,904.11 | 76,000,000.00 | 10.00 | 92 | Actual / Actual | 1/04/99 | 1/04/00 |
| Q BANK | W | 836 | 37,806.22 | 250,000,000.00 | 6.00 | 92 | Actual / Actual | 7/01/99 | 6/30/00 |
| R BANK | W | 836 | 2,054.79 | 26,000,000.00 | 10.00 | 30 | Actual / Actual | 10/31/99 | 10/30/00 |
| S BANK | W | 836 | 4,246.58 | 26,000,000.00 | 10.00 | 62 | Actual / Actual | 10/31/99 | 10/31/00 |
| T BANK | W | 869 | 45,369.86 | 300,000,000.00 | 6.00 | 92 | Actual / Actual | 3/13/99 | 3/12/00 |
| U BANK | W | 869 | 12,602.74 | 170,000,000.00 | 8.00 | 61 | Actual / Actual | 11/01/99 | 4/07/00 |
| V BANK | W | 869 | 22,726.77 | 60,000,000.00 | 10.00 | 92 | Actual / Actual | 7/01/99 | 7/01/00 |
| W BANK | W | 869 | 47,260.27 | 150,000,000.00 | 12.50 | 92 | Actual / Actual | 7/01/99 | 7/01/00 |
| X BANK | A | 836 | 11,342.47 | 76,000,000.00 | 6.00 | 92 | Actual / Actual | 6/30/99 | 4/26/00 |
| Y BANK | A | 836 | 16,904.11 | 76,000,000.00 | 10.00 | 92 | Actual / Actual | 7/01/99 | 6/30/00 |
| Z BANK | W | 842 | 100,821.92 | 400,000,000.00 | 10.00 | 92 | Actual / Actual | 1/01/96 | 11/22/00 |

Start    11:11 AM

FIG. 17

Generate Credit Line Accrual Report by Pay Type

Credit Line Accrual By Pay Type

CONFIDENTIAL
Run Date: 1/5/2000  6:16:15PM

Credit Line Accrual Report By Pay Type
10/1/99 - 12/31/99

| Bank Name | Pay Type | CF Code | Accrual | Credit Line | Fee | Days | Calculation Method | Effective Date | Termination Date |
|---|---|---|---|---|---|---|---|---|---|
| A BANK | A | 095 | 1,336.98 | 10,000,000.00 | 8.00 | 61 | Actual/Actual | 11/01/99 | 4/07/00 |
| A BANK | A | 096 | 6,301.37 | 25,000,000.00 | 10.00 | 92 | Actual/Actual | 12/12/97 | 12/12/02 |
| B BANK | A | 135 | 12,602.74 | 50,000,000.00 | 10.00 | 92 | Actual/Actual | 6/30/96 | 6/30/03 |
| C BANK | A | 024 | 4,010.96 | 30,000,000.00 | 8.00 | 61 | Actual/Actual | 11/01/99 | 4/07/00 |
| C BANK | A | 024 | 1,369.86 | 100,000,000.00 | 10.00 | 5 | Actual/Actual | 12/27/99 | 12/31/04 |
| C BANK | A | 024 | 23,835.62 | 100,000,000.00 | 10.00 | 87 | Actual/Actual | 10/01/99 | 12/26/99 |
| D BANK | A | 004 | 15,123.29 | 100,000,000.00 | 6.00 | 92 | Actual/Actual | 1/04/99 | 12/31/99 |
| D BANK | A | 004 | 16,904.11 | 75,000,000.00 | 10.00 | 92 | Actual/Actual | 1/04/99 | 12/31/03 |
| E BANK | A | 036 | 11,342.47 | 75,000,000.00 | 6.00 | 92 | Actual/Actual | 6/30/99 | 4/26/00 |
| F BANK | A | 013 | 18,904.11 | 50,000,000.00 | 10.00 | 92 | Actual/Actual | 7/01/99 | 6/30/04 |
| G BANK | A | 005 | 12,602.74 | 200,000,000.00 | 10.00 | 92 | Actual/Actual | 5/11/96 | 9/30/02 |
| G BANK | A | 005 | 30,246.58 | 600,000,000.00 | 6.00 | 61 | Actual/Actual | 1/12/99 | 1/1/00 |
| G BANK | A | 005 | 66,849.32 | 250,000,000.00 | 10.00 | 92 | Actual/Actual | 11/01/99 | 4/07/00 |
| H BANK | A | 043 | 63,886.89 | 150,000,000.00 | 6.00 | 92 | Actual/Actual | 1/22/99 | 1/22/04 |
| I BANK | A | 036 | 37,806.22 | 75,000,000.00 | 12.50 | 92 | Actual/Actual | 7/01/96 | 11/01/05 |
| J BANK | A | 159 | 23,630.14 | 50,000,000.00 | 10.00 | 92 | Actual/Actual | 11/01/96 | 12/23/03 |
| K BANK | A | 076 | 7,561.64 | 200,000,000.00 | 6.00 | 92 | Actual/Actual | 12/24/96 | 6/03/96 |
| L BANK | A | 141 | 30,246.58 | 150,000,000.00 | 6.00 | 92 | Actual/Actual | 3/27/99 | 3/26/00 |
| M BANK | A | 133 | 22,684.93 | 400,000,000.00 | 6.00 | 92 | Actual/Actual | 7/30/99 | 7/26/00 |
| M BANK | A | 133 | 12,602.74 | 50,000,000.00 | 10.00 | 92 | Actual/Actual | 7/30/99 | 7/31/04 |
| N BANK | A | 160 | 12,602.74 | 50,000,000.00 | 10.00 | 92 | Actual/Actual | 2/13/99 | 2/13/04 |
| O BANK | A | 037 | 69,493.15 | 400,000,000.00 | 6.00 | 92 | Actual/Actual | 7/09/99 | 7/06/00 |
| O BANK | A | 037 | 53,479.45 | 400,000,000.00 | 8.00 | 69 | Actual/Actual | 11/01/99 | 4/07/00 |
| O BANK | A | 037 | 76,666.67 | 300,000,000.00 | 10.00 | 92 | Actual/Actual | 7/09/99 | 7/09/04 |
| P BANK | A | 039 | 55,136.99 | 175,000,000.00 | 12.50 | 92 | Actual/Actual | 7/01/99 | 7/01/05 |

| Pay Type | Treasury Number | CF Code | Bank Name | Payment |
|---|---|---|---|---|
| A | 015 | 059 | A BANK | 15,276.71 |
| A | 040 | 123 | B BANK | 60,863.02 |
| A | 058 | 042 | C BANK | 10,235.61 |
| A | 065 | 039 | D BANK | 55,136.99 |
| A | 099 | 116 | E BANK | 16,767.12 |
| A | 116 | 067 | F BANK | 16,904.11 |
| A | 470 | 013 | G BANK | 12,602.74 |
| A | 572 | 010 | H BANK | 25,750.68 |
| A | 877 | 063 | I BANK | 15,753.42 |
| A | 969 | 141 | J BANK | 30,246.56 |
| A | 964 | 006 | K BANK | 23,630.14 |
| A | LBK | 095 | L BANK | 7,638.36 |
| A | MBK | 076 | M BANK | 7,561.64 |
| A | NBK | 004 | N BANK | 34,027.40 |
| A | OBK | 005 | O BANK | 160,964.79 |
| A | PBK | 043 | P BANK | 37,806.22 |
| A | QBK | 133 | Q BANK | 35,267.57 |
| A | RBK | 012 | R BANK | 47,890.42 |
| A | SBK | 160 | S BANK | 12,602.74 |
| A | TBK | 037 | T BANK | 190,639.27 |
| A | UBK | 135 | U BANK | 12,502.74 |
| A | VBK | 146 | V BANK | 26,205.45 |
| A | WBK | 053 | W BANK | 12,502.74 |
| A | XBK | 055 | X BANK | 63,774.74 |
| A | YBK | 065 | Y BANK | 34,972.61 |
| A | ZBK | 031 | Z BANK | 26,205.45 |

FIG. 19

Generate Gateway ACH Report

Gateway ACH Report
CONFIDENTIAL
Run Date: 2/5/2000   8:27:13 AM   Value Date 1/04/2000   1 of 3

| Funds Transfer Type | Transfer Model ID | Amount | Value Date |
|---|---|---|---|
| ACHP | CF000004 | 15,123.20 | 1/04/2000 |
| ACHP | CF000004 | 18,904.11 | 1/04/2000 |
| ACHP | CF000005 | 30,246.58 | 1/04/2000 |
| ACHP | CF000005 | 63,888.89 | 1/04/2000 |
| ACHP | CF000005 | 66,849.32 | 1/04/2000 |
| ACHP | CF000008 | 23,630.14 | 1/04/2000 |
| ACHP | CF000010 | 4,010.96 | 1/04/2000 |
| ACHP | CF000010 | 8,301.37 | 1/04/2000 |
| ACHP | CF000010 | 7,561.64 | 1/04/2000 |
| ACHP | CF000012 | 7,876.71 | 1/04/2000 |
| ACHP | CF000012 | 7,643.84 | 1/04/2000 |
| ACHP | CF000012 | 8,493.15 | 1/04/2000 |
| ACHP | CF000012 | 15,041.10 | 1/04/2000 |
| ACHP | CF000013 | 16,712.33 | 1/04/2000 |
| ACHP | CF000022 | 12,602.74 | 1/04/2000 |
| ACHP | CF000024 | 34,027.40 | 1/04/2000 |
| ACHP | CF000024 | 1,369.86 | 1/04/2000 |
| ACHP | CF000024 | 4,010.96 | 1/04/2000 |
| ACHP | CF000024 | 23,835.62 | 1/04/2000 |
| ACHP | CF000031 | 25,205.48 | 1/04/2000 |
| ACHP | CF000032 | 6,684.93 | 1/04/2000 |
| ACHP | CF000032 | 12,602.74 | 1/04/2000 |
| ACHP | CF000032 | 15,123.29 | 1/04/2000 |
| ACHP | CF000036 | 11,342.47 | 1/04/2000 |
| ACHP | CF000036 | 18,904.11 | 1/04/2000 |
| ACHP | CF000037 | 53,479.45 | 1/04/2000 |
| ACHP | CF000037 | 60,493.15 | 1/04/2000 |
| ACHP | CF000037 | 76,666.67 | 1/04/2000 |
| ACHP | CF000038 | 10,849.32 | 1/04/2000 |

900 — Funds Transfer Type
902 — Transfer Model ID
904 — Amount
908 — Value Date

FIG. 20

| | | | | |
|---|---|---|---|---|
| | | Gateway Wire Report | | |
| CONFIDENTIAL | | | | |
| Run Date: 1/06/2000 | 10:06:35AM | | Value Date 1/04/2000 | 1 of 3 |
| 910 — Funds Transfer Type | 912 — Transfer Model ID | | 914 — Amount | 920 — Value Date |
| FWRP | CFW00800 | | 12,602.74 | 1/04/2000 |
| FWRP | CFW00801 | | 18,504.11 | 1/04/2000 |
| FWRP | CFW00802 | | 17,360.82 | 1/04/2000 |
| FWRP | CFW00803 | | 75,616.44 | 1/04/2000 |
| FWRP | CFW00803 | | 24,065.75 | 1/04/2000 |
| FWRP | CFW00803 | | 45,369.60 | 1/04/2000 |
| FWRP | CFW00804 | | 22,684.93 | 1/04/2000 |
| FWRP | CFW00804 | | 25,205.48 | 1/04/2000 |
| FWRP | CFW00805 | | 31,506.85 | 1/04/2000 |
| FWRP | CFW00805 | | 50,410.96 | 1/04/2000 |
| FWRP | CFW00806 | | 63,013.70 | 1/04/2000 |
| FWRP | CFW00807 | | 30,246.58 | 1/04/2000 |
| FWRP | CFW00807 | | 46,794.52 | 1/04/2000 |
| FWRP | CFW00807 | | 52,931.51 | 1/04/2000 |
| FWRP | CFW00808 | | 78,767.12 | 1/04/2000 |
| FWRP | CFW00808 | | 45,369.86 | 1/04/2000 |
| FWRP | CFW00809 | | 57,972.60 | 1/04/2000 |
| FWRP | CFW00809 | | 71,079.45 | 1/04/2000 |
| FWRP | CFW00810 | | 15,753.42 | 1/04/2000 |
| FWRP | CFW00810 | | 60,493.15 | 1/04/2000 |
| FWRP | CFW00812 | | 15,753.42 | 1/04/2000 |
| FWRP | CFW00812 | | 18,904.11 | 1/04/2000 |
| FWRP | CFW00813 | | 31,506.85 | 1/04/2000 |
| FWRP | CFW00813 | | 60,493.15 | 1/04/2000 |
| FWRP | CFW00814 | | 47,260.27 | 1/04/2000 |

FIG. 21

Generate Borrowing Detail Report By Due Date

Borrowing Detail Report By Due Date

As of: 12/31/1999

Run Date: 1/04/2000 11:06:12AM

CONFIDENTIAL

| 930 | 932 | 934 | 936 | 940 | 942 | 944 | 946 | 948 |
|---|---|---|---|---|---|---|---|---|
| Originator | Borrower | Bank Name | Currency Type | Borrowing Local Currency | Exchange Rate | Borrowing U.S. Dollar | Due Date | Notes |
| | GECC | | | | | | | |
| GECC | GECC | A BANQUE | EUR | 20,000,000 | 2.00 | 40,000,000.00 | 1/07/00 | Third |
| | | Sub Total Currency Type: EUR | | 20,000,000 | | 40,000,000.00 | | |
| GECC | GECC | B BANK | JPY | 100,000,000 | 100.00 | 1,000,000.00 | 1/14/00 | Fourth |
| | | Sub Total Currency Type: JPY | | 100,000,000 | | 1,000,000.00 | | |
| GECC | GECC | C BANK | USD | 100,000,000 | 1.00 | 100,000,000.00 | 1/05/00 | Second |
| GECC | GECC | D BANK | USD | 50,000,000 | 1.00 | 50,000,000.00 | 1/06/00 | First |
| | | Sub Total Currency Type: USD | | 150,000,000 | | 150,000,000.00 | | |

FIG. 22

Generate Borrowing Detail Report By Expiration

Borrowings Detail Report By Expiration

Preview: 1 of 7   100%   Re-run Report

Borrowing Detail Report By Expiration 950

CONFIDENTIAL
Run Date: 1/04/2000  11:07:27AM      As of: 12/31/1999

| Originator | Borrower | Bank Name | Currency Type | Borrowing Local Currency | Exchange Rate | Borrowing U.S. Dollar | Value Date | Due Date | Unused Credit Line (US $) | CL Terminated |
|---|---|---|---|---|---|---|---|---|---|---|
| | GECC | | | | | | 952 | 954 | 956 | |
| GECC | GECC | A BANQUE | EUR | 20,000,000 | 2.00 | 20,000,000.00 | 12/29/1999 | 1/07/2000 | 310,000,000.00 | |
| | Sub Total Currency Type: EUR | | | 20,000,000 | | 20,000,000.00 | | | 310,000,000.00 | |
| GECC | | B BANK | JPY | 100,000,000 | 100.00 | 1,000,000.00 | 12/30/1999 | 1/14/2000 | 74,000,000.00 | |
| | Sub Total Currency Type: JPY | | | 100,000,000 | | 1,000,000.00 | | | 74,000,000.00 | |
| GECC | | C BANK | USD | 100,000,000 | 1.00 | 100,000,000.00 | 12/29/1999 | 1/05/2000 | 200,000,000.00 | |
| GECC | | D BANK | USD | 50,000,000 | 1.00 | 50,000,000.00 | 12/29/1999 | 1/06/2000 | 150,000,000.00 | |
| | Sub Total Currency Type: USD | | | 150,000,000 | | 150,000,000.00 | | | 350,000,000.00 | |

Start                                                                11:11AM

| Originator | Borrower | Bank Name | Currency Type | Borrowing Local Currency | Exchange Rate | Borrowing U.S. Dollar | Value Date | Due Date | Unused Credit Line (US $) | Cl. Terminal |
|---|---|---|---|---|---|---|---|---|---|---|
| | GECC | | | | | | | | | |
| GECC | GECC | A BANQUE | EUR | 20,000,000 | 2.00 | 40,000,000.00 | 12/29/1999 | 1/07/00 | 310,000,000.00 | |
| | Sub Total Currency Type: EUR | | | 20,000,000 | | 40,000,000.00 | | | 310,000,000.00 | |
| GECC | GECC | B BANK | JPY | 100,000,000 | 100.00 | 1,000,000.00 | 12/30/1999 | 1/14/00 | 74,000,000.00 | |
| | Sub Total Currency Type: JPY | | | 100,000,000 | | 1,000,000.00 | | | 74,000,000.00 | |
| GECC | GECC | C BANK | USD | 60,000,000 | 1.00 | 60,000,000.00 | 12/29/1999 | 1/06/00 | 150,000,000.00 | |
| GECC | GECC | D BANK | USD | 100,000,000 | 1.00 | 100,000,000.00 | 12/29/1999 | 1/05/00 | 200,000,000.00 | |
| | Sub Total Currency Type: USD | | | 160,000,000 | | 160,000,000.00 | | | 350,000,000.00 | |

FIG. 25

| Originator | Borrower | Bank Name | Currency Type | Borrowing Local Currency | Exchange Rate | Borrowing U.S. Dollar | Value Date | Due Date | Unused Credit Line (US $) | CL Terminal |
|---|---|---|---|---|---|---|---|---|---|---|
| | GECC | | | | | | | | | |
| GECC | GECC | A BANQUE | EUR | 20,000,000 | 2.00 | 40,000,000.00 | 12/29/1999 | 1/07/2000 | 310,000,000.00 | |
| | Sub Total Currency Type: EUR | | | 20,000,000 | | 40,000,000.00 | | | 310,000,000.00 | |
| GECC | GECC | B BANK | JPY | 100,000,000 | 100.00 | 1,000,000.00 | 12/30/1999 | 1/14/2000 | 74,000,000.00 | |
| | Sub Total Currency Type: JPY | | | 100,000,000 | | 1,000,000.00 | | | 74,000,000.00 | |
| GECC | GECC | C BANK | USD | 50,000,000 | 1.00 | 50,000,000.00 | 12/29/1999 | 1/06/2000 | 200,000,000.00 | |
| GECC | GECC | D BANK | USD | 100,000,000 | 1.00 | 100,000,000.00 | 12/29/1999 | 1/05/2000 | 150,000,000.00 | |
| | Sub Total Currency Type: USD | | | 150,000,000 | | 150,000,000.00 | | | 350,000,000.00 | |

FIG. 26

| Capacity Available Report | | |
|---|---|---|
| Preview | | |

Generate Capacity Available Report By Bank

Re-run Report

Capacity Available Report By Bank

CONFIDENTIAL
Run Date: 1/04/2000   11:16:30AM   Report Date: 12/31/1999                                                                 1 of 5

| Credit Line ID | Originator | Bank Name | State Country | Unused Credit Line (U.S. $) | CL Termination Date |
|---|---|---|---|---|---|
| 03 | GE | A BANK | NET | 250,000,000.00 | 12/28/2000 |
| 04 | GECC | A BANK | NET | 600,000,000.00 | 12/24/2000 |
| 437 | GECC | A BANK | NET | 260,000,000.00 | 04/07/2000 |
| 91 | GECC | B BANK | AUS | 25,000,000.00 | 12/12/2002 |
| 416 | GECC | B BANK | AUS | 10,000,000.00 | 04/07/2000 |
| 63 | GECC | C BANK | JOR | 100,000,000.00 | 06/06/2000 |
| 93 | GECC | D BANK | JAP | 100,000,000.00 | 01/31/2002 |
| 103 | GE | E BANK | ITA | 100,000,000.00 | 05/30/2000 |
| 104 | GECC | E BANK | ITA | 200,000,000.00 | 06/30/2000 |
| 105 | GECC | E BANK | ITA | 100,000,000.00 | 06/01/2006 |
| 425 | GECC | E BANK | ITA | 120,000,000.00 | 04/07/2000 |
| 190 | GECC | F BANK | ITA | 60,000,000.00 | 06/30/2003 |
| 326 | GECC | G BANK | ITA | 100,000,000.00 | 12/31/2004 |
| 416 | GECC | G BANK | ITA | 30,000,000.00 | 04/07/2004 |
| 115 | GECC | H BANK | ITA | 100,000,000.00 | 12/31/1999 |
| 116 | GECC | H BANK | ITA | 75,000,000.00 | 12/31/2003 |
| 261 | GECC | I BANK | ITA | 250,000,000.00 | 06/30/2000 |
| 263 | GECC | I BANK | SFA | 25,000,000.00 | 10/31/2004 |
| 99 | GECC | J BANK | SFA | 300,000,000.00 | 03/12/2000 |
| 101 | GECC | J BANK | SFA | 150,000,000.00 | 07/01/2004 |
| 102 | GECC | J BANK | SFA | 170,000,000.00 | 04/07/2006 |
| 422 | GECC | K BANK | ITA | 75,000,000.00 | 04/26/2000 |
| 296 | GECC | K BANK | ITA | 75,000,000.00 | 06/30/2004 |
| 288 | GECC | L BANK | SFA | 400,000,000.00 | 11/22/2002 |
| 59 | GECC | M BANK | ISR | 50,000,000.00 | 09/30/2002 |
| 38 | GE | N BANK | NC | 200,000,000.00 | 01/11/2000 |
| 125 | | | | | |

Start   11:11AM

Generate Borrowings Interest Accruals Report in Local Currency

| | | | | Borrowing Interest Accruals Report In Local Currency | | | | | |
|---|---|---|---|---|---|---|---|---|---|
| CONFIDENTIAL | | | | | | | | | |
| Run Date: | 1/04/2000 | 12:23:14PM | | Accrual Period | 12/30/1999 to 12/31/1999 | | | | |
| Originator | Borrower | Bank Name | Currency Type | Borrowing Local Currency | Interest Accrual | Spread | Benchmark | Days | Basis Type | Value Date |
| GECC | | | | | | | | | | |
| GECC | GECC | A BANQUE | EUR | 20,000,000 | 3,750.00 | 25.00 | 2.00 | 3 | Actual/360 | 12/29/1999 |
| | Sub Total Currency Type: EUR | | | 20,000,000 | 3,750.00 | | | | | |
| GECC | GECC | B BANK | JPY | 100,000,000 | 17,606.22 | 25.00 | 3.00 | 2 | Actual/Actual | 12/30/1999 |
| | Sub Total Currency Type: JPY | | | 100,000,000 | 17,606.22 | | | | | |
| GECC | GECC | C BANK | USD | 50,000,000 | 21,876.00 | 25.00 | 5.00 | 3 | Actual/360 | 12/29/1999 |
| GECC | GECC | D BANK | USD | 100,000,000 | 44,791.67 | 37.50 | 5.00 | 3 | Actual/360 | 12/29/1999 |
| | Sub Total Currency Type: USD | | | 150,000,000 | 66,666.67 | | | | | |

FIG. 32

SYSTEMS AND METHODS FOR CREDIT LINE MONITORING

BACKGROUND OF THE INVENTION

This invention relates generally to credit line monitoring and, more specifically, to credit line tracking and borrowing methods and systems.

A treasury operation of a multi-billion dollar corporation manages money for many different divisions within the corporation as well as for affiliates and other related entities. In connection with significant transactions and other operational needs, the treasury operation also secures and manages credit lines with commercial banks. At a given time, the corporation may have numerous credit lines with domestic as well international banks. Each credit line, if drawn by the company, may have its own variables such as interest rates, period, currency and so on. Additionally, for each credit line, the treasury operation maintains information regarding the borrowings, payments, conversion from or to foreign currency, and other relevant information.

Managing the complexities of these numerous credit lines is a challenging task. For example, simply managing payments for maintaining credit lines at numerous banks in many different jurisdictions and varying currencies in itself is a substantial undertaking. Ensuring that financial institutions from which such credit lines are secured are viable, by maintaining relevant credit rating information, also requires significant resources.

BRIEF SUMMARY OF THE INVENTION

The present invention facilitates efficient credit line monitoring which includes tracking borrowings as well as posting journal entries automatically for financial reporting.

In one embodiment, the present invention is a method for tracking bank credit lines and borrowing against credit lines using a Credit Line System (CLS) coupled to a centralized database. The method involves manually tracking credit ratings of a bank, requesting the bank to establish a line of credit, accessing a centralized database to obtain and maintain information regarding the line of credit, transmitting domestic and international wire information for cash movement to the bank, and finally posting journal entries to a general ledger for financial monitoring, reporting and auditing purposes.

In another aspect, the present invention is a system for computer-based credit line monitoring. In an exemplary embodiment, the system includes at least one server system, a client system configured with a browser, a centralized database coupled to the server system to implement, manage and monitor bank credit lines drawn and undrawn and the credit ratings including credit ratings, currencies, interest rates, borrowings against credit lines, cash payments and finally posting the related journal entries.

BRIEF DESCRIPTION OF THE DRAWINGS

FIG. 6 is an exemplary embodiment of some of the functionality of Credit Line Module;

FIG. 7 is a continuation of the functionality of Credit Line Module;

FIG. 8 is an exemplary embodiment of the functionality of Borrowing Module;

FIG. 9 is an exemplary embodiment of the functionality of Journal Entry Module;

FIG. 11 is an exemplary embodiment of a credit line detail report by bank;

FIG. 12 is an exemplary embodiment of a credit line detailed report by expiration;

FIG. 13 is an exemplary embodiment of a credit lines ranking report;

FIG. 14 is an exemplary embodiment of a credit line report;

FIG. 16 is an exemplary embodiment of a credit line accrual report by bank name;

FIG. 17 is an exemplary embodiment of a credit line accrual report by pay type;

FIG. 18 is an exemplary embodiment of a credit line payment report;

FIG. 19 is an exemplary report of a Gateway ACH report;

FIG. 20 is an exemplary embodiment of a Gateway Wire report;

FIG. 21 is an exemplary embodiment of a Borrowing Detailed Report By Due Date;

FIG. 22 is an exemplary embodiment of a Borrowing Detailed Report By Expiration;

FIG. 23 is an exemplary embodiment of a Borrowing Detailed Report By State/Country;

FIG. 24 is an exemplary embodiment of a Borrowing Detailed Report By Unused Credit Lines;

FIG. 25 is an exemplary embodiment of a Borrowing Detailed Report By Value Date;

FIG. 26 is an exemplary embodiment of capacity available report by bank;

FIG. 27 is a borrowings repayment report;

FIG. 28 is an exemplary embodiment of a borrowings interest paid report by currency;

FIG. 29 is an exemplary embodiment of a borrowings domestic ACH report;

FIG. 30 is an exemplary embodiment of a borrowings domestic wire report;

FIG. 31 is an exemplary embodiment of a borrowings interest accruals report in local currency; and FIG. 32 is an exemplary embodiment of a composite rate repot.

DETAILED DESCRIPTION OF THE INVENTION

The present invention, in one aspect, is a computer-based method for credit line assessment.

Exemplary embodiments of systems and processes that facilitate integrated network-based electronic reporting and workflow process management related to credit line assessment are described below in detail. The systems and processes facilitate, for example, electronic submission of information using a client system, automated extraction of information, and windows-based assessment reporting.

The systems and processes are not limited to the specific embodiments described herein. In addition, components of each system and each process can be practiced independent and separate from other components and processes described herein. Each component and process also can be used in combination with other components and processes.

The application resides on an IIS Server with a SQL Server 7.0 database. In an exemplary embodiment, the application is web enabled and being run on a business entity's intranet. In yet another embodiment, the application is fully accessed by individuals having an authorized access outside the firewall of the business entity through the Internet. In a third exemplary embodiment, the application is being run in a windows NT environment. The application is flexible and designed to run in a various different environments without compromising any major functionality.

Figure 1:
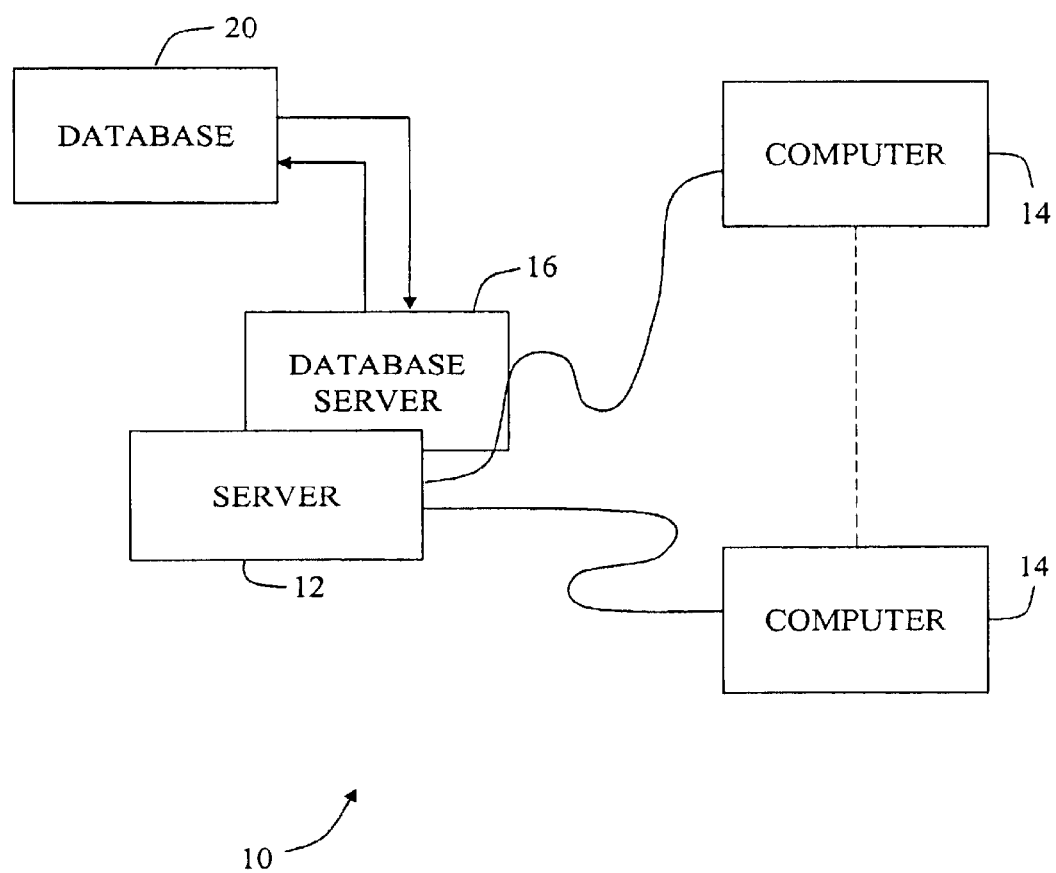
FIG. 1 is a simplified block diagram of a Credit Line System (CLS) for tracking bank credit lines and borrowings against credit lines.

FIG. 1 is a simplified block diagram of a Credit Line System (CLS) 10 for tracking bank credit lines and borrowings. System 10 includes a server system 12 and a plurality of client systems 14 connected to server system 12. In one embodiment, client systems 14 are computers including a web browser, and server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. In another embodiment, client systems 14 could be any device capable of interconnecting to the Internet including a web-based telephone or other web-based connectable equipment. A database server 16 is connected to a centralized database 20 containing product related information on a variety of products, as described below in greater detail, is stored on server system 12 and can be accessed by potential users at one of client systems 14 by logging onto server system 12 through one of client systems 14.

In one embodiment, server system 12 is coupled to computers 14 via a WAN or LAN. A user may dial or directly log on to an intranet or the Internet to gain access. Each computer 14 includes an interface for communicating with server system 12. The interface allows a user to input data and to receive data relating to the request. A computer-based tool for credit line assessment, as described below in more detail, is stored in server system 12 and can be accessed by a user at server 12 or any one of computers 14.

Server system 12 is configured to receive a request to establish or expand an applicant's line of credit, to access the applicant's current credit exposure and to calculate the applicant's eligibility for establishing or expanding the line of credit. Current credit exposure includes any information relevant to an applicant's credit history, including, but not limited to, credit line and borrowing information. Server system 12 is further configured for reporting the applicant's eligibility for establishing or expanding the line of credit. The interface allows the user or applicant to input data relating to the request and to receive eligibility output. In one embodiment, the user or applicant is a bank, company, organization or an individual applicant.

Figure 2:
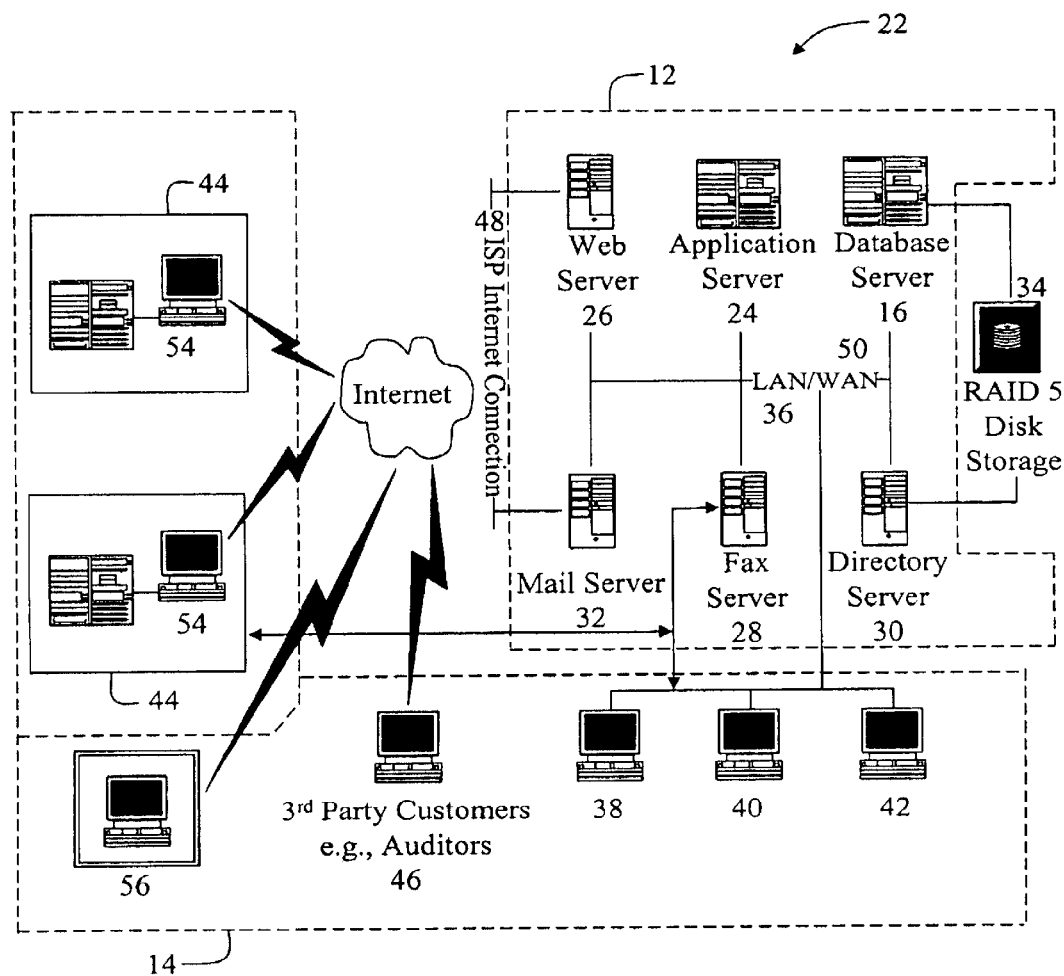
FIG. 2 is an expanded version block diagram of an exemplary embodiment of server architecture of CLS.

FIG. 2 is an expanded version block diagram of an exemplary embodiment of server architecture of a Credit Line System (CLS) 22. Components in system 22 identical to components of system 10 (shown in FIG. 1) are identified in FIG. 2 using the same reference numerals as used in FIG. 1. System 22 includes a server system 12 and client system 14. Server system 12 includes a database server 16 and further includes an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user or credit analyst's workstation 40, and a supervising officer's workstation 42 are coupled to LAN 36. Alternatively, workstations 38, 40, and 42 are coupled to LAN 36 via an Internet link or are connected through intranet.

Each workstation, 38, 40, and 42 is a personal computer including a web browser. Although the functions performed at the workstations typically are illustrated as being performed at respective workstations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

In another embodiment, server system 12 is configured to be communicatively coupled to various banks 44 and to third parties, e.g., internal or external auditors 46 via an ISP Internet connection 48. The communication in the exemplary embodiment is illustrated as being performed via the Internet, however, any other wide area network (WAN) 50 type communication can be utilized in other embodiments, i.e., the systems and processes are not limited to being practiced via the Internet. In addition, and rather than a WAN, a local area network could be used in place of the WAN.

In the exemplary embodiment, each outside bank or a business entity 44 has a workstation 54. One of the client systems includes a senior manager's workstation 56 located at a remote location or located overseas. Work stations 54 and 56 are personal computers including a web browser. Also, work stations 54 and 56 are configured to communicate with server system 12. Furthermore, fax server 28 communicates with outside banks 44 and any of the remotely located client systems including a client system 56 via a telephone link. Fax server 28 is configured to communicate with other client systems 38, 40, and 42 as well.

Figure 3:
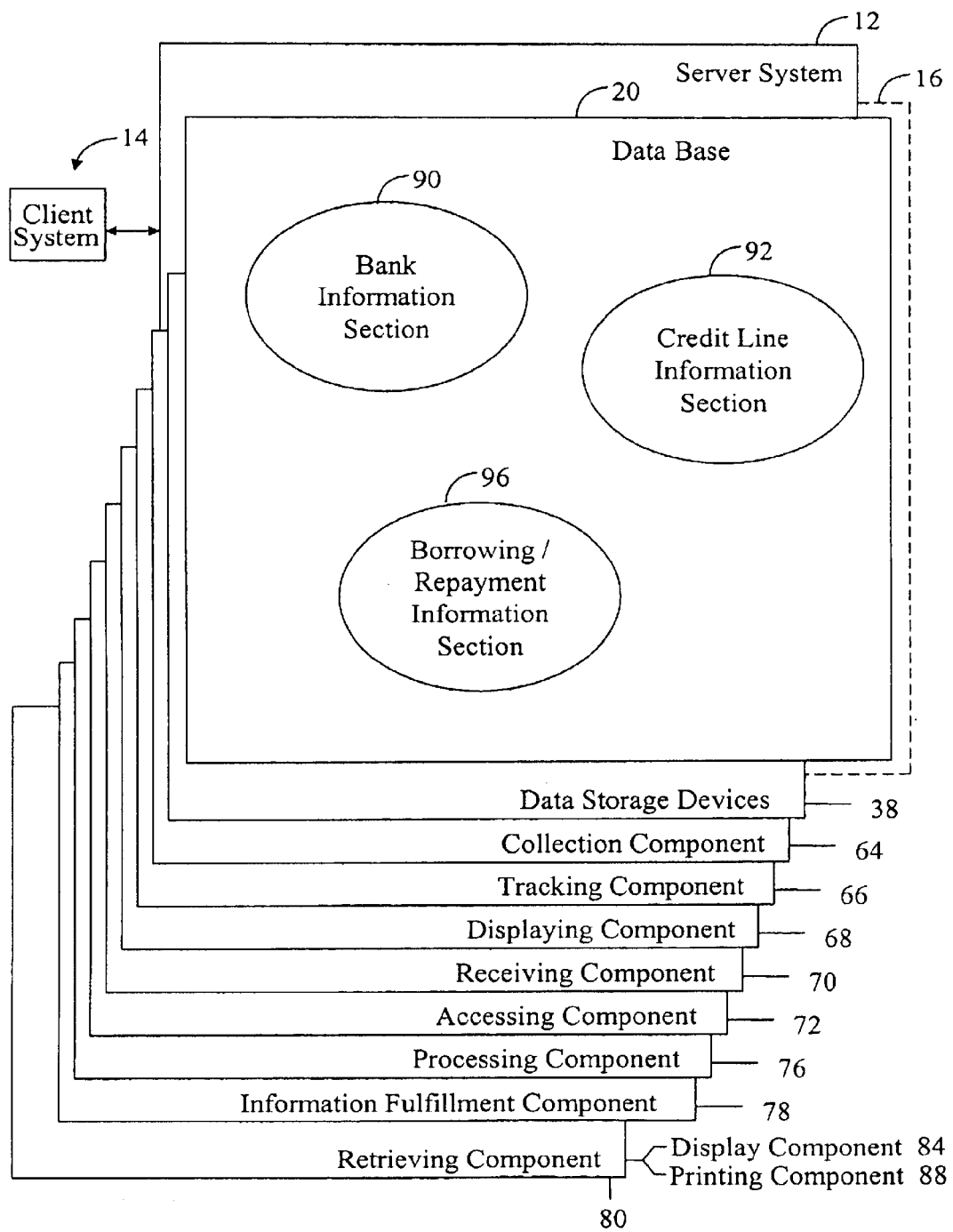
FIG. 3 shows a configuration of a database within database server 16 of server system shown in FIG. 1.

FIG. 3 shows a configuration of database 20 within database server 16 of server system 12 shown in FIG. 1. Database 20 is coupled to several separate components within server system 12, which perform specific tasks.

Server system 12 includes a collection component 64 for collecting information from users into centralized database 20, a tracking component 66 for tracking information, a displaying component 68 to display information, a receiving component 70 to receive a specific query from client system 14, and an accessing component 72 to access centralized database 20. Receiving component 70 is programmed for receiving a specific query from one of a plurality of users. Server system 12 further includes a processing component 76 for searching and processing received queries against data storage device 34 containing a variety of information collected by collection component 64. An information fulfillment component 78, located in server system 12, downloads the requested information to the plurality of users in the order in which the requests were received by receiving component 70. Information fulfillment component 78 downloads the information after the information is retrieved from data storage device 34 by a retrieving component 80. Retrieving component 80 retrieves, downloads and sends information to client system 14 based on a query received from client system 14 regarding various alternatives.

Retrieving component 80 further includes a display component 84 configured to download information to be displayed on client system's graphical user interface and a printing component 88 configured to print information. Retrieving component 80 generates various reports requested by the user through client system 14 in a predetermined format. System 10 is flexible to provide various alternative types of report and is not constrained to particular options set forth in any particular embodiment.

CLS 10 is a searchable database 20 built in SQL server, which is divided into three main sections that interconnect. The first section is a Bank Information Section 90. Every bank has a basic entry that lists the name of a bank, the contact person, location, areas of expertise, discount/other financial terms, business or location of the bank. The second section is a Credit Line Information Section 92. Credit lines obtained by the corporation are linked to the internal system of each of the bank. Basic information is collected, such as a total credit line, when extended, what are the fees being paid for the credit line, interest rate on the credit line, and so on. CLS 10 generates different reports, such as total fees and related matters by business, location, practice area, etc. The third section of CLS, Borrowings/Repayment Information Section 96, includes information on Borrowings/Repayments. This section tracks information on repayment amount against the specific borrowing from each bank, date the payment was made, amount credited to interest as well as principal, if any and other related information. Bank Information Section 90, Credit Line Information 92 and Borrowings/Repayment Information Section 96 are all integrated together to provide comprehensive information. Updating information within one section also automatically updates the relevant information in other sections of the database to maintain integrity.

The architectures of system 10 as well as various components of system 10 are exemplary only. Other architectures are possible and can be utilized in connection with practicing the processes described below.

Figure 4:
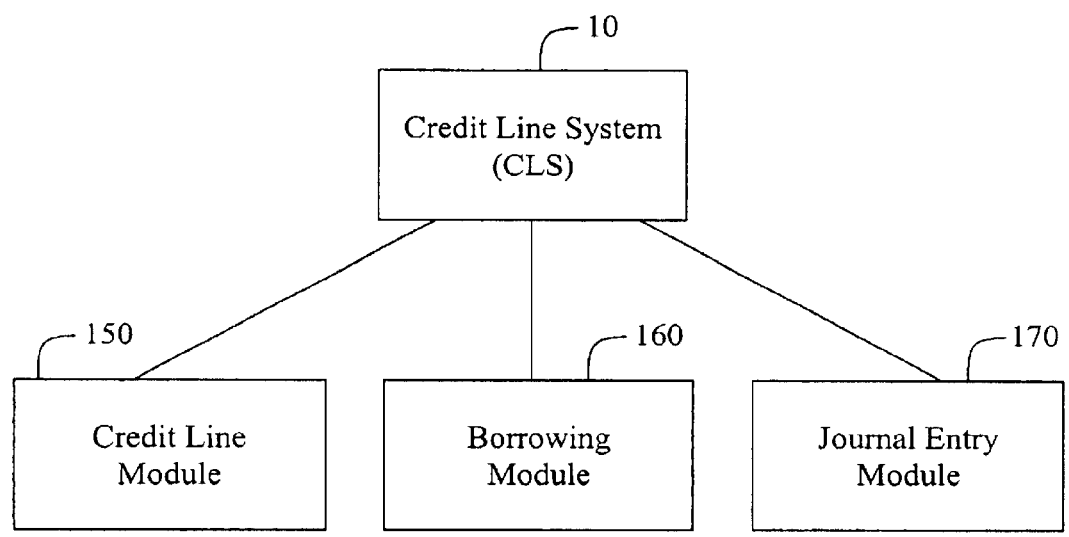
FIG. 4 is an exemplary embodiment of various modules as utilized in implementing CLS.

FIG. 4 is an exemplary embodiment of various modules as utilized in implementing CLS 10. CLS 10 includes a Credit Line Module 150, a Borrowing Module 160 and a Journal Entry Module 170 of Credit Line System (CLS) 10. Credit Line Module 150, Borrowing Module 160 and Journal Entry Module 170 are integrated together to perform several comprehensive functions.

Figure 5:
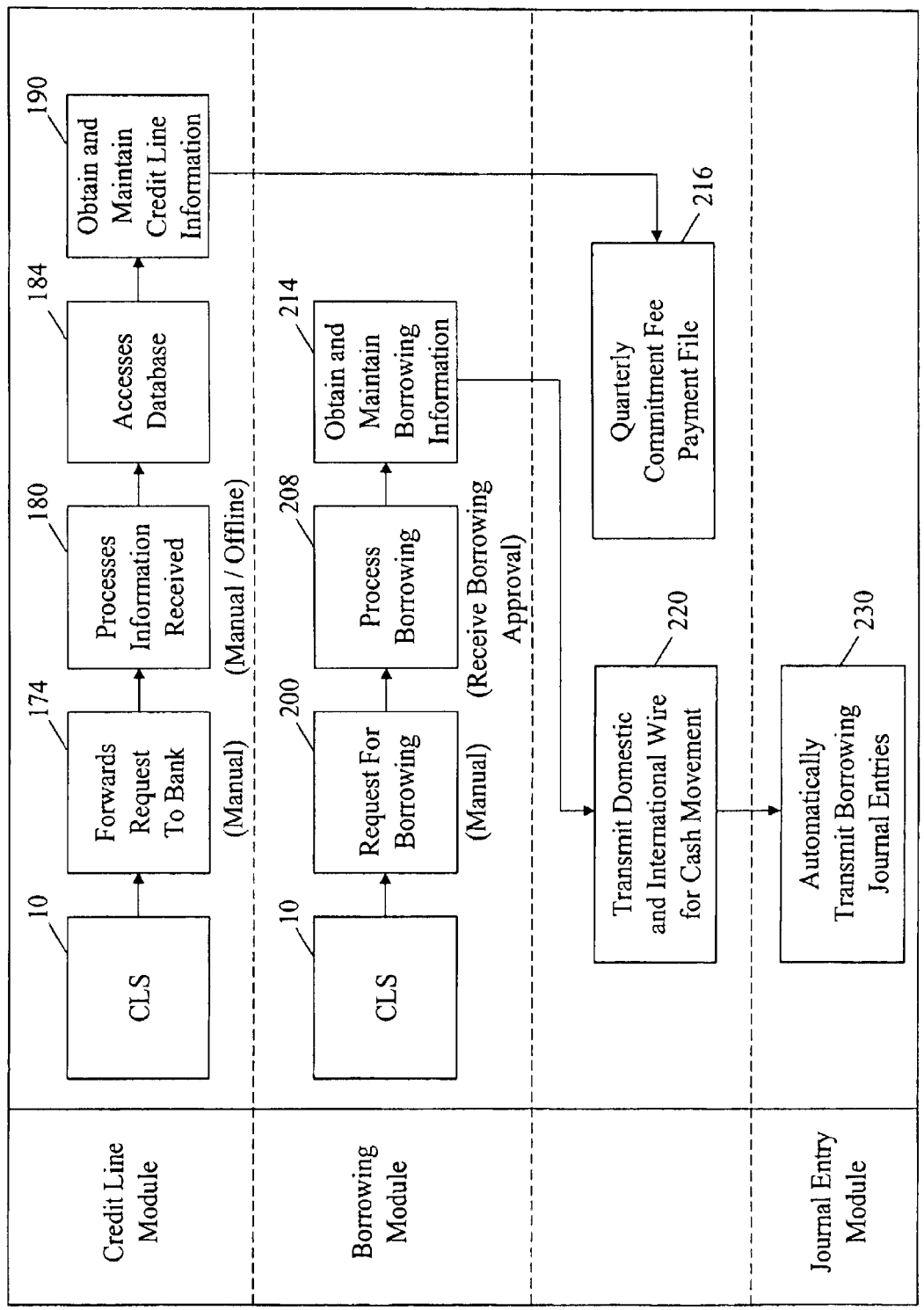
FIG. 5 is an exemplary embodiment of activity process steps as implemented by CLS.

FIG. 5 is an exemplary embodiment of activity process steps as implemented by CLS 10. The business entity, contacts a commercial bank by phone 174 either to establish a credit line or to change a credit line. The business entity may be a remote individual applicant, a company, or an organization. CLS 10 processes information 180 obtained manually from various commercial banks on an on-going basis and stores appropriate information in database 20. Database 20 has information about various banks' credit ratings as well as their financial condition. System 10 accesses 184 database 20 to obtain and maintain 190 information through Credit Line Module 150 (shown in FIG. 4) about current credit line commitments, history, and amount available for borrowing from each institution. System 10 user manually requests borrowing against credit line from bank 200, receives 208 borrowing approval from commercial banks, and finally obtains/maintains 214 real time current borrowings and the history relating to each credit line through Borrowing Module 160 (shown in FIG. 4). Commitment fees are paid 216 to each bank on a quarterly basis for the credit line. System 10 transmits 220 domestic as well as international wire information for cash movement to ensure that each bank is paid on a periodic basis. Once the banks are paid, system 10 transmits borrowing journal entries 230 to the general ledger through Journal Entry Module 170 (shown in FIG. 4).

I. Credit Line Module 150

Credit Line Module 150 addresses credit application, approval and tracking process.

The applicant's credit exposure is accessed using a central database that automatically tracks the applicant's current credit exposure information. The central database includes information relevant to an applicant's credit exposure. In a specific embodiment, the central database includes current credit line commitments, credit history, amount of available credit for borrowing, repayment history and real-time current borrowing information. As used herein, track means to monitor and/or update by the user.

In an exemplary embodiment, system 10 (shown in FIG. 1) generates credit line reports. Various credit line reports are generated, including, but not limited to, management reports, credit line accrual reports, accounting reports, cash management reports, payment reports and commitment fee wire files. The credit line report is detailed by bank, expiration, originator, credit line type or any other method of detailing. The credit line accrual report is detailed by pay type, bank name or any other detailing method. In a specific embodiment, system 10 submits at least one file to a bank wire system.

Credit Line Module 150 performs several functions, some of which are described briefly in FIG. 6 and FIG. 7 and explained hereunder. FIGS. 6 and 7 describe a function type 232, a function description 234, and function dependencies 236. Each of the function types 232 are displayed to the user in user friendly screens (not shown in FIGS. 6 and 7). Function descriptions 234 provide brief overview of the functionality. On the other hand, function dependencies 236 provides the user with information pertaining to various dependencies which must be addressed prior to accessing a specific function. The user accesses the functionality features after the user logs on to system 10 through a system displayed log-in 240 screen with a valid user identification and a valid password.

Various functionality features of Credit Line Module 150 are:

a. Maintain State/Country 250 features allows the user to add, update, delete and view valid state and country types.

b. Maintain Basis Type 254, Maintain Bank Rating 256, Maintain Credit Line Type 258, Maintain Payment Type 264, and Maintain Bank 270 allow the user to add, update, delete and view a valid functionality specific to each one of these functions.

c. Change Bank Rating History 284 permits the user to perform updates of bank rating for a specific bank.

d. Other functionality and features of Credit Line Module 150, as described briefly in FIGS. 6 and 7, include Maintain Bank Contact 290, Maintain Commitment Fee 294, Add Credit Line Contract 298, Amend Credit Line Contract 302, Cancel Credit Line Contract 308, Extend Credit Line Contract 312.

e. Other functionality and features of Credit Line Module 150, as further described in FIGS. 6 and 7, include Change Maturity Type 320, Merge Credit Line Contract 324, Update Notes 328, Generate Credit Line Detail Report by Bank 330, Generate Credit Line Detail Report by Expiration 334, Generate GECC/GE Credit Lines Ranking Report 340, Generate GECC Credit Lines Report 344, Generate GECS Credit Lines 350, Generate GECC Ratings Report 354, Generate Credit Line Accrual Report by Bank Name 360, Generate Credit Line Accrual Report by Pay Type 364, Generate Credit Line Payment Report 370, Generate Gateway ACH Report 374, Generate Gateway ACH File 380 which creates ACH fee payment file for submission to the bank wire system, Generate Gateway Wire 384 which lists federal wire fee payment information, and finally Generate Gateway Wire File 390 which creates wire fee payment file for submission to the bank wire system.

II. Borrowing Module 160

In an exemplary embodiment, Borrowing Module 160 of system 10 generates various types of borrowing reports. Borrowing reports generated include management reports, accounting reports and cash management reports. In an alternative embodiment, the borrowing report is detailed by due date, expiration of a credit line, location, unused credit lines, value date, bank, repayment report, interest paid by currency, domestic borrowing, domestic wire report and interest report in local currency. In a specific embodiment, system 10 inputs the reports to a bank wire system. In an alternative embodiment, system 10 (shown in FIG. 1) also automatically transmits domestic and international wire for cash movements to a bank.

In yet another embodiment, system 10 (shown in FIG. 1) generates composite rate report. Composite rate report display average rate information for each borrowing outstanding during a select period. In another exemplary embodiment, system 10 maintains reports and other records in a cross-reference file or a central database.

Borrowing Module 160 performs several functions, some of which are depicted in FIG. 8 and briefly explained hereunder. The user accesses the functionality features after the user logs on to system 10 through a system displayed log-in screen with a valid user identification and a valid password.

The functionality features of Borrowing Module 160, as described briefly in FIG. 8, include: Maintain Currency Type 400, Maintain Available Currency 404, Maintain Currency Exchange Rate 408, Maintain Borrowing Spread 412, Maintain Benchmark Description 416, Maintain Benchmark Rate 420, Maintain Fed Funds Rate 424, Add Borrowing 428, Delete Borrowing 432, Add Repayment 436, Generate Borrowing Detail Report by Due Date 440, Generate Borrowing Detail Report by Expiration 444, Generate Borrowing Detail Report by State/Country 448, Generate Borrowing Detail Report by Unused Credit Line 452, Generate Borrowing Detail Report by Value Date 456, Generate Capacity Available Report by Bank 460, Generate Borrowings Repayment Report 464, Generate Borrowings Interest Paid Report by Currency 468, Generate Borrowing Domestic ACH Report 472, Generate Borrowings Domestic Wire Report 476, Generate Borrowings Interest Accrual Report in Local Currency 480, and Generate Composite Rate Report 484. The capabilities of each of these functions as well as dependencies are briefly explained in FIG. 8.

III. Journal Entry Module 170

Journal Entry Module 170 performs several functions, some of which are described briefly in FIG. 9 and explained hereunder. Various functionality is accessed by the user after the user logs on to system 10 through a system displayed log-in screen with a valid user identification and a valid password.

The functionality features of Journal Entry Module 170, as described briefly in FIG. 9 includes: Maintain Cross Reference 488, Select Transactions 492, Preview Transactions 496, Delete Transactions 500, Create Journal Entries 504, Preview Journal Entries 508, Export Journal Entries 512, Delete Journal Entries 516, and View JE Text File 520. The capabilities of each of these functions as well as dependencies are briefly explained in FIG. 9.

IV. User Steps

Figure 10:
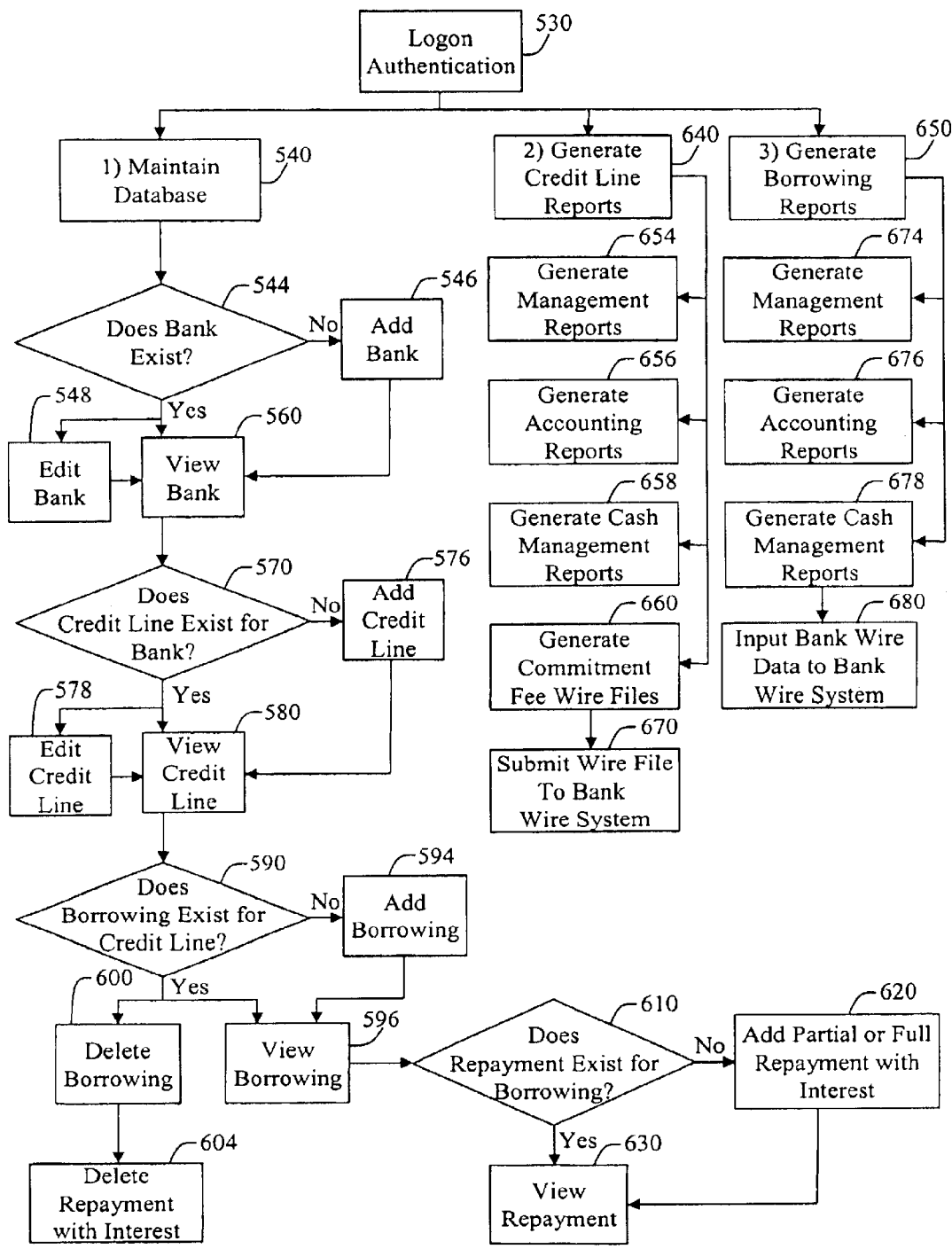
FIG. 10 is an alternative embodiment of overall Credit Line Process Flow.

FIG. 10 is an alternative embodiment of Credit Line Process Flow. In this embodiment, the central database described above is maintained. More specifically, FIG. 10 is a flowchart for process steps executed in one embodiment of system 10 (shown in FIG. 1). First, a user or applicant will log on 530 to system 10 and select an option to maintain 540 the database. In a specific embodiment, the applicant is a bank, a company or any other organization. In yet another specific embodiment, an applicant or user enters a valid user identification and valid password into system 10. The user checks 544 whether a bank exists or does not exist in system 10. Where a particular bank does not exist, information about the bank is added 546 to system 10 by a user or applicant. If the bank does exist, the information about the bank is then edited 548. The information could be viewed 560 by the user relating to any bank that has been added or already exists in the system.

The next step involves the user checking 570 whether a credit line for a given bank exists or not. If after viewing 560 the bank, if credit line does not exist, the user adds 574 credit line to system 10. If a credit line does exist, it is edited 578 or viewed 580 by the user. The next step in the process involves determining 590 if the borrowing exists for credit line relating to a particular bank. If no borrowing information exists for actual borrowings, the user adds 594 the borrowing into system 10. Where borrowing exists against a given credit line, it is viewed 596, or deleted 600, as appropriate. If the user deletes borrowing 600, the user also deletes repayment with interest 604. After viewing borrowing, the user is requested to determine 610 whether repayment exists for a given borrowing. If repayment does not exist, the user adds 620 partial or full repayment with the interest as appropriate. If the repayment does exist, the user simply views repayment information 630.

In an alternative embodiment, system 10 (shown in FIG. 1) maintains information beneficial to the determination of an applicant's eligibility for credit within the central database described above. The information includes, but is not limited to, currency types, currency exchange rates, descriptions of applicants, exchange rates, federal funds rates, basis types, bank ratings, credit line types, payment types, bank information, bank rating history, bank contacts, journal entries and commitment fee information. Any currency type is included. An example of a currency type includes, but is not limited to, Euro legacy currency. Maintaining basis types include, but is not limited to, allowing a user or applicant to add a basis type. Maintaining bank information includes, but is not limited to, allowing a user or applicant to change a bank name and update notes.

System 10 (shown in FIG. 1) previews a transaction in an alternative embodiment. Previewing a transaction includes displaying the record in the transaction file that is selected by using the cross-reference file and data parameters. If the selection criteria include unwanted transactions, a delete function is used to eliminate them.

After log-on authentication 530, System 10 also offers menu choice options for generating Credit Line Reports 640 as well as Generating Borrowing Reports 650. Generate Credit Line Reports 640 permits the user to Generate Management Reports 654, Generate Accounting Reports 656, and Generate Cash Management Reports 658. System 10 allows the user to Generate Commitment Fee Wire Files 660 and to Submit Wire File to Bank Wire System 670. Similarly, Generate Borrowing Reports 650 permits the user to Generate Management Reports 674, Generate Accounting Reports 676, and Generate Cash Management Reports 678. Generate Cash Management Reports 678 is linked to Input Bank Wire Data to Bank Wire System 680, directly.

V. System Generated Reports

As discussed in FIGS. 6, 7, 8, and 9, system 10 generates a variety of reports including Credit Line Detail Report by Bank 330, Credit Line Detail Report by Expiration 334, GECC/GE Credit Lines Ranking Report 340, GECC Credit Lines Report 344, GECS Credit Lines 350, GECC Ratings Report 354, Credit Line Accrual Report by Bank Name 360, Credit Line Accrual Report by Pay Type 364, Credit Line Payment Report 370, Gateway ACH Report 374, Gateway ACH File 380 which creates ACH fee payment file for submission to the bank wire system, Gateway Wire 384 which lists federal wire fee payment information, and finally Gateway Wire File 390 which creates wire fee payment file for submission to the bank wire system.

Although some of these reports have been described in terms of various specific embodiments, it is not intended that these reports be limited to these embodiments. Modifications within the spirit of invention will be apparent to those skilled in the art.

Figure 11:
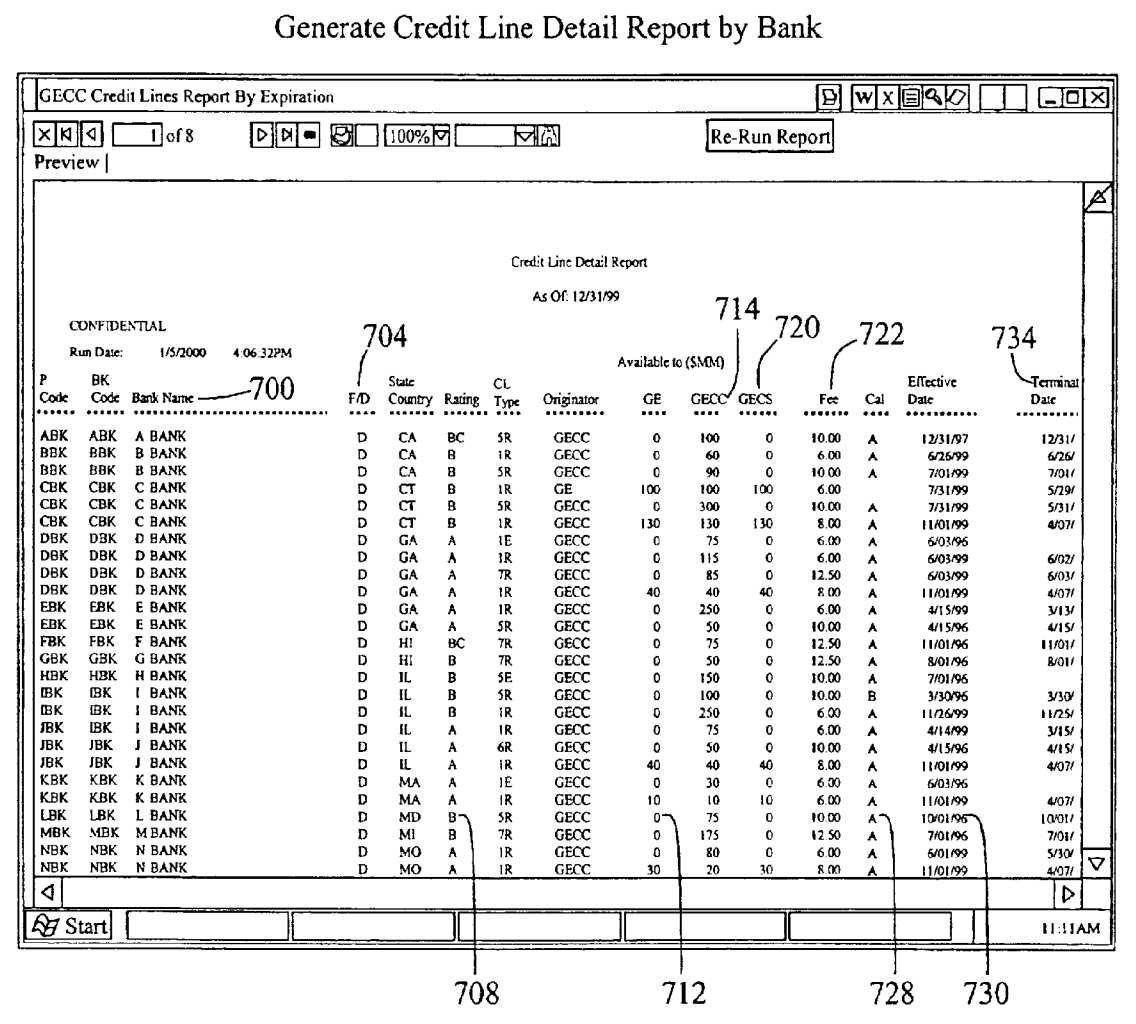

FIG. 11 is an exemplary embodiment of credit line detail report by bank 330. This report displays selected bank and credit line information by bank name. Report 330 identifies a bank name 700, whether the bank is a foreign or a domestic bank 704, and also a bank rating code 708. Additionally, the report also identifies the credit line amount for GE 712, GECC 714 and GECS 720 in millions of dollars. A commitment fee in basis points 722 is also identified on the report. The report further identifies a calculation code 728, an effective date 730, and a termination date 734 of the credit line.

FIG. 12 is an exemplary embodiment of a credit line detailed report by expiration 334. Report 334 displays selected bank and credit line information sorted by expiration date. Normally, report 334 is run on a monthly basis for management audit purposes. In an exemplary embodiment, report 334 identifies a bank code 740, a bank name 742, a credit line maturity type 744, a credit line amount for GE 746, GECC 748 and GECS 750. The report further identifies a commitment fee in basis points 756 as well as a termination date 760 of the credit line. The user has an option to insert any notes on this report, which are reflected against each bank. The report can be sorted in many different ways to improve the efficiency and utilization of the data.

FIG. 13 is an exemplary embodiment of credit lines ranking report 340. This report displays a total credit line amount originated against each bank by entity. The content of the report includes a bank name 770, credit lines originators such as GECC 772 and GE 774, total credit lines 778 originated by GECC 772 and GE 774 with maturity type greater than one year, and some other relevant information. For example, in an exemplary embodiment the report identifies that Bank of America 780, with whom GECC 772 has originated credit line of $2 billion and GE 774 has originated credit line of $200 million, has extended a total credit line of $2.2 billion.

Figure 14:
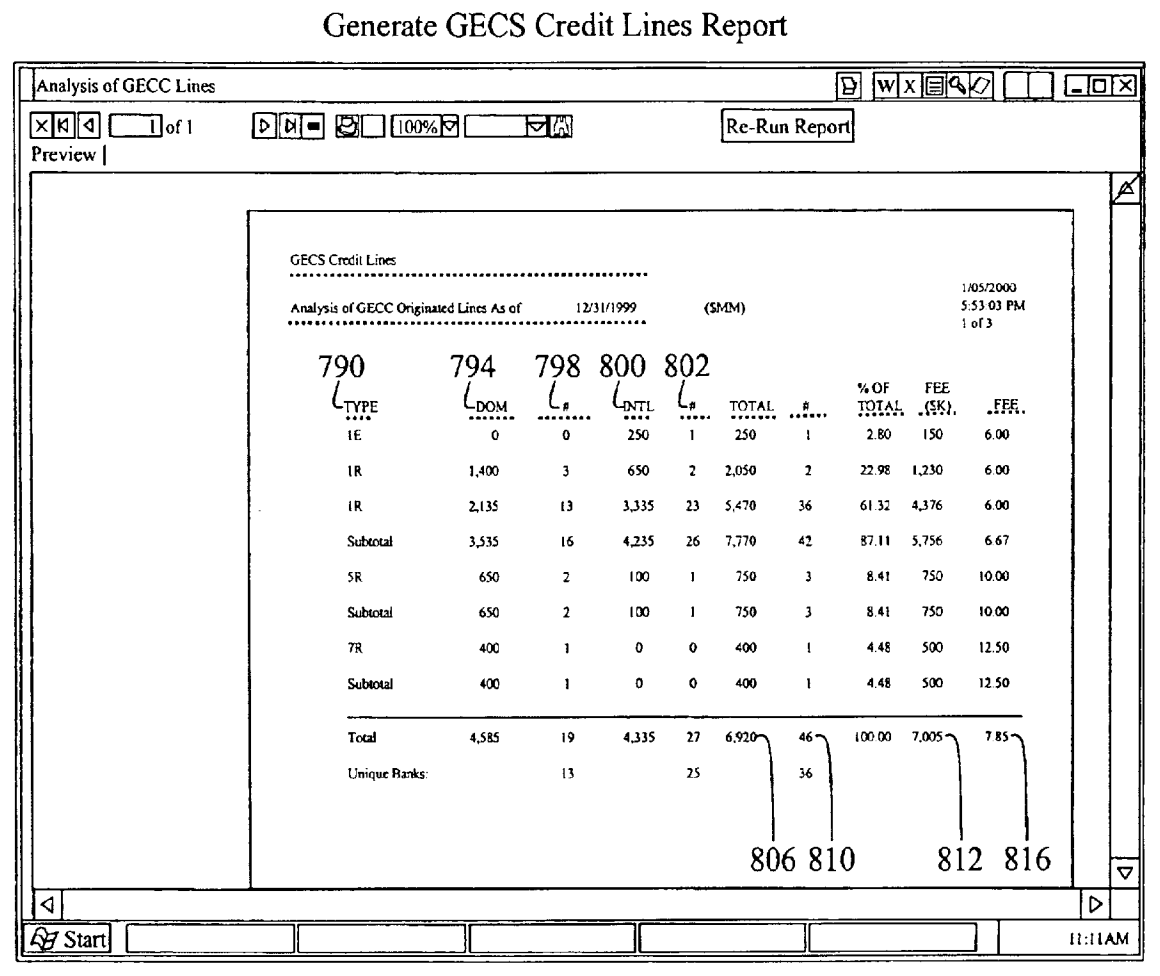

FIG. 14 is an exemplary embodiment of a credit line report 344 of GECC 772. Report 344 analyzes the credit lines originated by GECC 772 by credit types for domestic and international banks. Report 344 identifies a credit line type 790, a total credit line amount for domestic banks 794, a number of domestic banks involved in providing the total domestic credit line 798, a total credit line amount for international banks 800, a number of international credit lines 802, a total domestic and international credit line amount 806 and a number of domestic and international credit lines 810. The report further identifies total commitment fees in dollars 812 as well as commitment fees in basis points 816.

Figure 15:
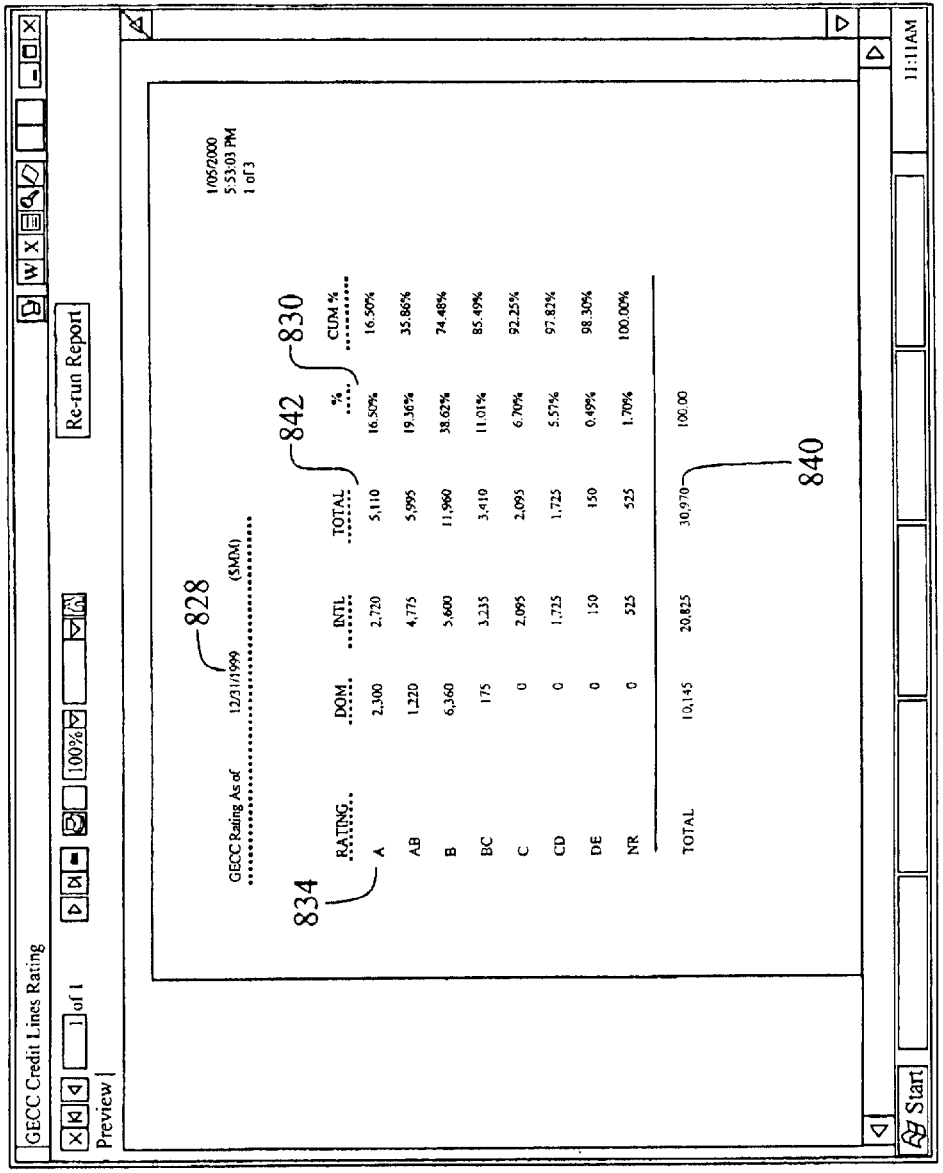
FIG. 15 is an exemplary embodiment of a GECC ratings report.

FIG. 15 is an exemplary embodiment of GECC ratings report 354. Report 354 analyzes credit lines of GECC 772 by bank rating for domestic and international bank as of a specific date 828. For example, report 354 identifies that, 16.50% of the total credit lines 830 as of Dec. 31, 1999 were provided by domestic and international banks having a credit rating of "A" 834. In other words, out of $30.970 billion dollars of total credit lines 840 outstanding as of Dec. 31, 1999, $5.110 billion dollars of credit lines 842 were provided by domestic and international banks having a credit rating of "A" 834.

FIG. 16 is an exemplary embodiment of credit line accrual report by bank name 360. This report displays commitment fee accruals for each credit line contract by a bank name 850 for a designated period 852. The report identifies a bank name 850, a payment type 854, cash management's model number 856, a fee accrual amount in U.S. dollars 860, a credit line amount 864, a commitment fee in basis points 866, number of days in the period 868, number of month-days and year-days used in the calculation, an effective date of the credit line contract 870, and a termination date 874 of the credit line contract.

FIG. 17 is an exemplary embodiment of credit line accrual report by pay type 364. Report 364 displays commitment fee accruals 880 for each credit line contract 882 by a payment type 884 for a designated period 886. This report is similar to the report in FIG. 16 and can be interpreted accordingly.

FIG. 18 is an exemplary embodiment of a credit line payment report 370. Report 370 displays commitment fee payments for each credit line contract by payment type for designated period. Report 370 is run quarterly or at such frequent periods as needed by the management. It includes a payment type 890, a bank identification number 892, cash management model number 894, a bank name 896, and a fee payment amount 898 in U.S. dollar for each bank.

FIG. 19 is an exemplary report on Gateway ACH report 374. This report displays the payment information in the Gateway ACH file. Report 374 is run quarterly. It is important that a credit line payment report and payment data to the credit line payment table is posted prior to running report 374. Report 374 includes funds transfer type 900, a transfer model identification number 902, an amount 904, which is a commitment fee amount in U.S. dollars, and a value date 908 used by the bank for its internal calculations.

FIG. 20 is an exemplary embodiment of Gateway Wire report 384. Report 384 displays the payment information in the Gateway Wire file. Report 384 is run on a quarterly basis. Report 384 also includes a funds transfer type 910, a transfer model identification number 912, an amount of commitment fees in U.S. dollars 914, and a value date 920 used by bank for calculations.

Borrowing Module 160 of system 10 also generates a variety of management reports including Borrowing Detail Report by Due Date 440, Borrowing Detail Report by Expiration 444, Borrowing Detail Report by State/Country 448, Borrowing Detail Report by Unused Credit Line 452, Borrowing Detail Report by Value Date 456, Capacity Available Report by Bank 460, Borrowings Repayment Report 464, Borrowings Interest Paid Report by Currency 468, Borrowing Domestic ACH Report 472, Borrowings Domestic Wire Report 476, Borrowings Interest Accrual Report in Local Currency 480, and Composite Rate Report 484.

FIG. 21 is an exemplary embodiment of Borrowing Detail Report By Due Date 440. This report displays selective borrowing information by due date. For example, report 440 identifies an originator of credit line 930, a borrower 932, a bank name 934, a currency type 936 such as Euro currency or Japanese Yen, a borrowed amount in local currency 940, an exchange rate 942 at the time of borrowing, borrowed amount in U.S. dollar 944, a due date 946, and any comments 948 on borrowings.

FIG. 22 is an exemplary embodiment of a Borrowing Detail Report By Expiration 444. Report 444 displays selected borrowing information by credit line termination date. This report is similar to report 440 depicted in FIG. 21. However, report 444 adds some additional information such as a date 950 that funds are available, a maturity date 952, U.S. dollar amount available for borrowing 954 and a credit line termination date 956.

Figure 23:
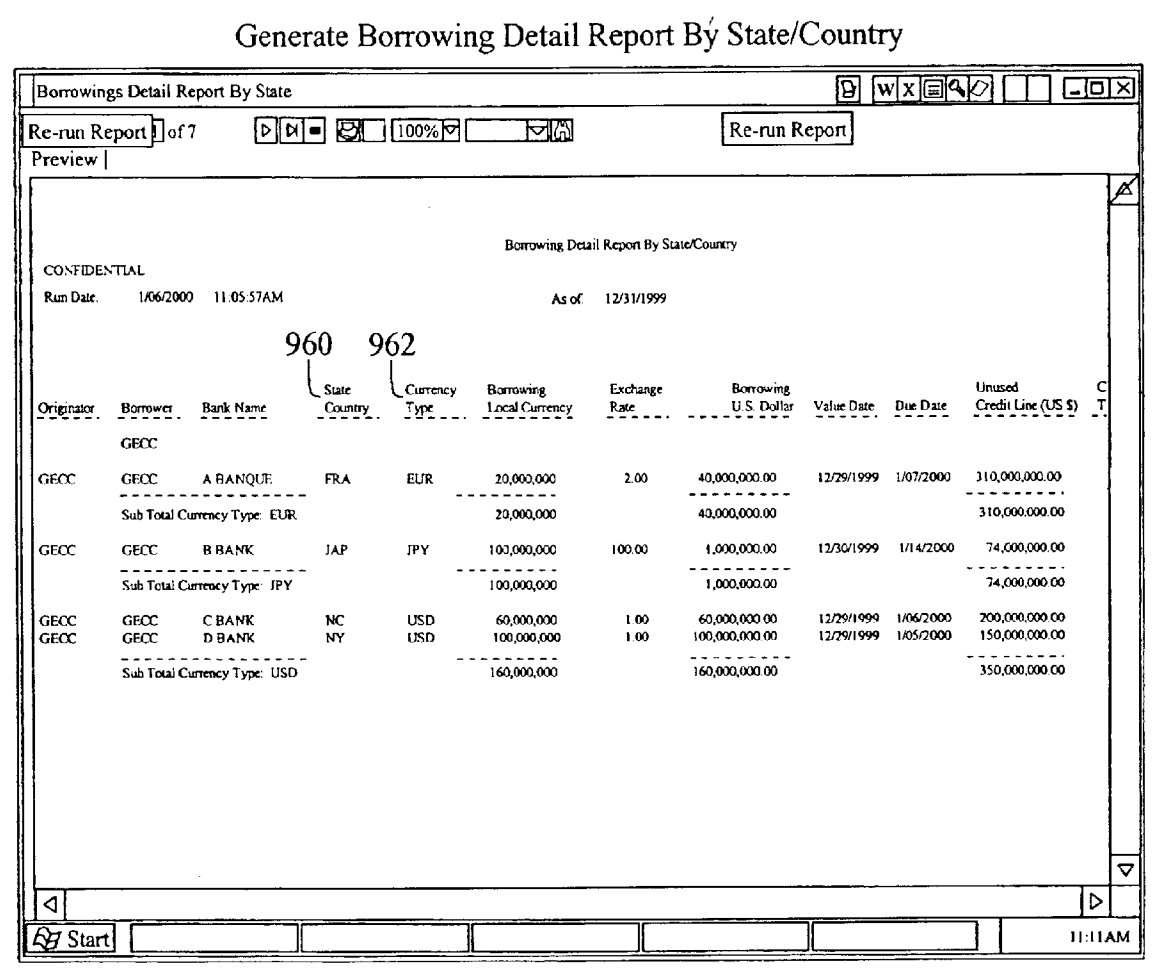

FIG. 23 is an exemplary embodiment of Borrowing Detail Report By State/Country 448. Report 448 displays selected borrowing information by a state/country 960 and a currency type 962. It also segregates the report in different ways to make it user friendly.

FIG. 24 is an exemplary embodiment of Borrowing Detail Report By Unused Credit Lines 452. Report 452 displays selected borrowing information 964 by unused credit line 968. Report 452 is printed on an as needed basis. This report is similar to reports 444 and 448, as identified in FIGS. 22 and 23 respectively.

FIG. 25 is an exemplary embodiment of Borrowing Detail Report By Value Date 456. Report 456 displays selected borrowing information 970 by a value date 972.

FIG. 26 is an exemplary embodiment of capacity available report by bank 460. Report 460 displays unused credit line information by bank name. For example, in a specific embodiment report 460 displays a credit line identification number 976, an originator of a credit line 978, a bank name with which the credit line exists 980, a state or a country code 982, and an unused credit line 984 in U.S. dollars with a termination date 986 of a credit line.

Figure 27:
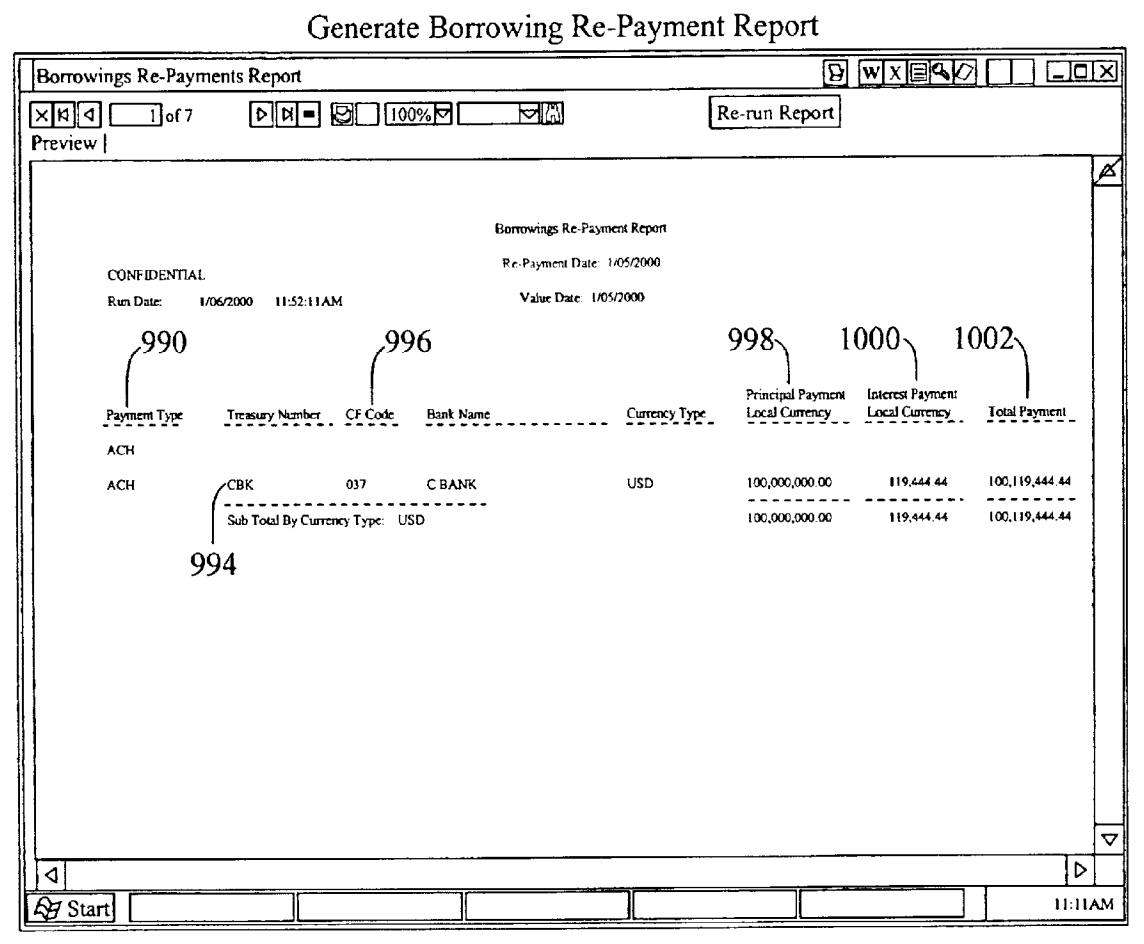

FIG. 27 is a borrowings repayment report 464. Report 464 displays selected borrowing repayment information by currency type within payment type. For example, report 464 identifies a particular payment type 990. Either ACH or wire 990, a bank identification code, a bank name 994, a currency code 996, a principal repayment amount in local currency 998, an interest repayment amount in local currency 1000, and a total payment 1002, which includes principal repayment as well as interest repayment in total currency. Reviewing report 464, the user notes that Citibank has been paid approximately $100 million in local currency with a total interest payment of $119,444.44, and the payment type was ACH.

Figure 28:
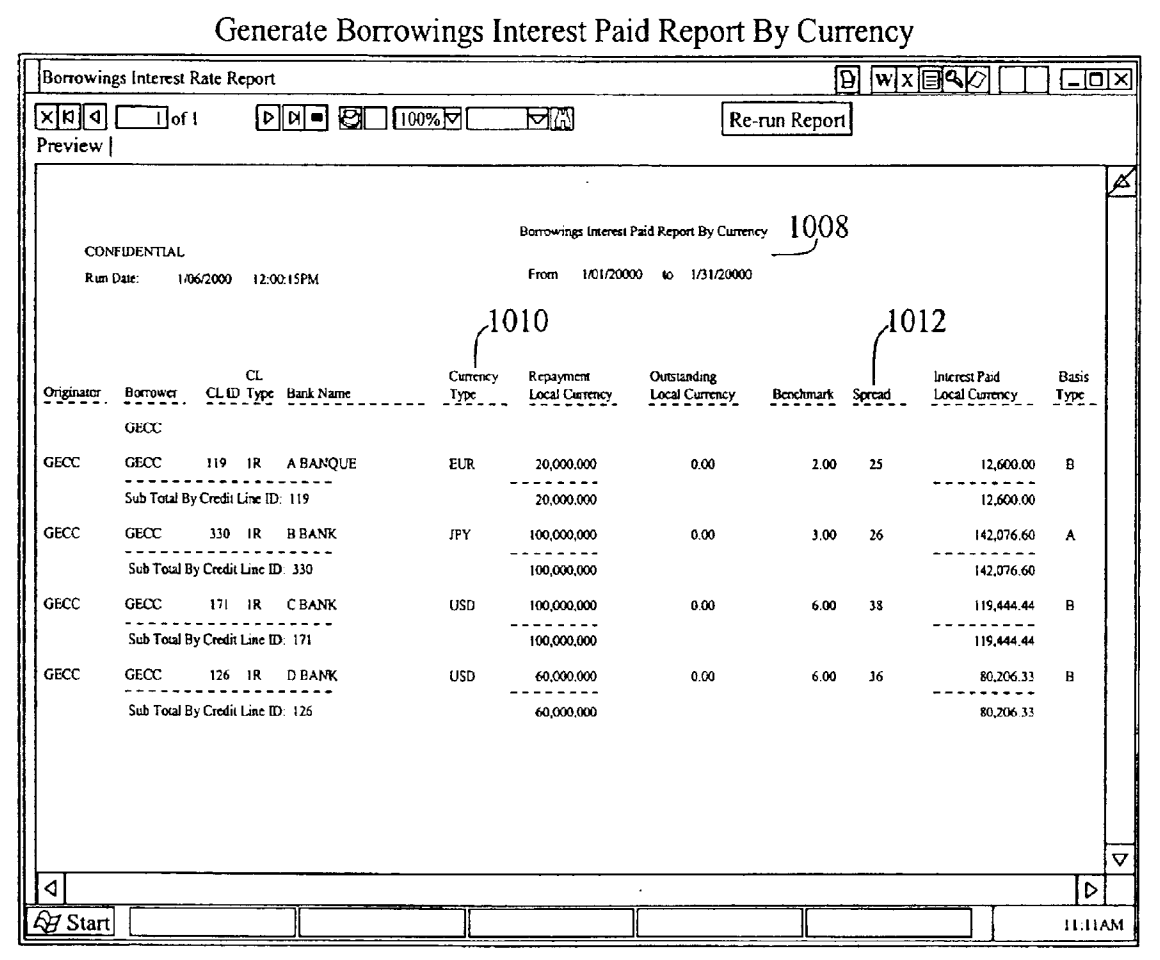

FIG. 28 is an exemplary embodiment of borrowings interest paid report by currency 468. Report 468 displays interest paid on borrowings information for a selected period 1008 by currency 1010 and a spread 1012.

Figure 29:
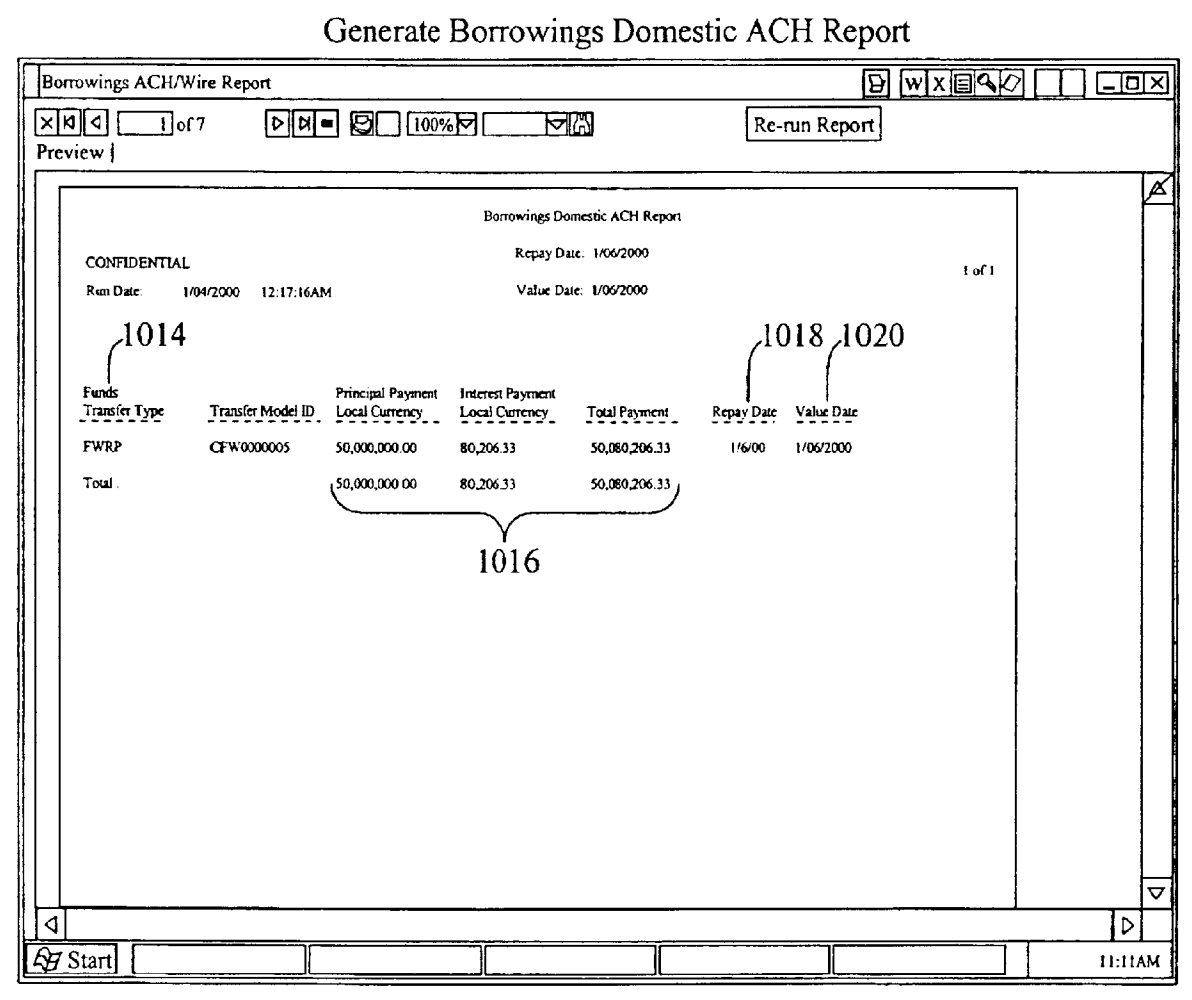

FIG. 29 is an exemplary embodiment of borrowings domestic ACH report 472. Report 472 displays domestic ACH funds transfer information for the repayment date. Report 472 also displays a funds transfer type 1014, total payment 1016 (which is broken down into principal and interest components), a repayment date 1018 and a value date 1020 which is the date used by banks for their calculations.

Figure 30:
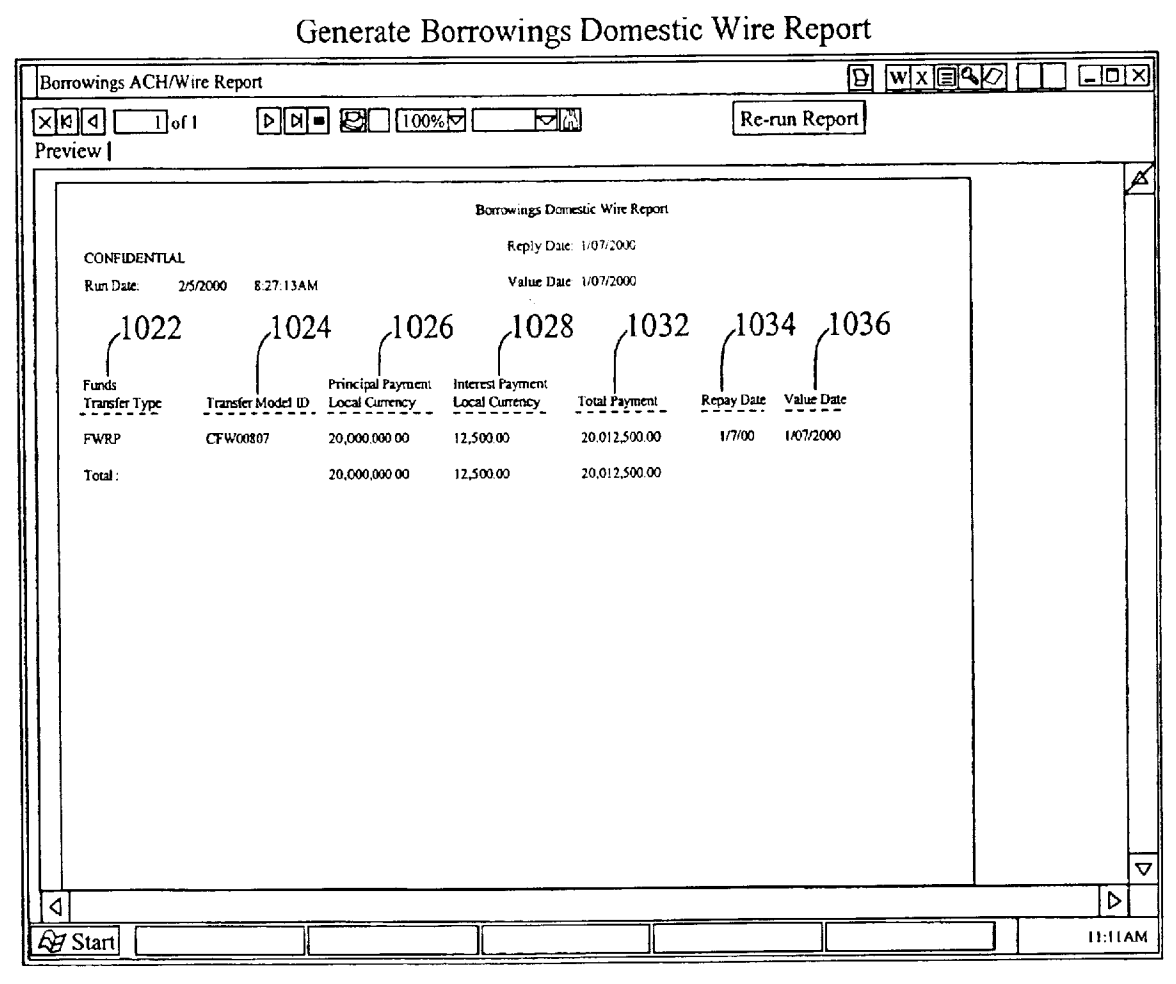

FIG. 30 is an exemplary embodiment of borrowings domestic wire report 476. Report 476 displays domestic wire funds transfer information for the repayment date. The report identifies cash management's funds transfer code (type) 1022, transfer model I.D. 1024 which identifies cash management's model identification number, principal payment in local currency 1026, an interest payment in a local currency 1028, and a total payment 1032 which includes principal payment as well as interest payment in local currency. Report 476 also identifies a repayment date 1034 as well as a value date 1036.

FIG. 31 is an exemplary embodiment of borrowings interest accruals report in local currency 480. Report 480 displays interest accrual information for a selected period. For example, report 480 identifies an originator of the credit line 1040, a borrower's name 1042, name of a bank 1044, a currency type 1046, an amount borrowed 1050 in local currency, interest accrued to date 1052, a borrowing spread 1056, a benchmark rate 1060, days outstanding in period 1062, a basis type 1066, a value date 1070, and a due date or a maturity date (not shown).

Figure 32:
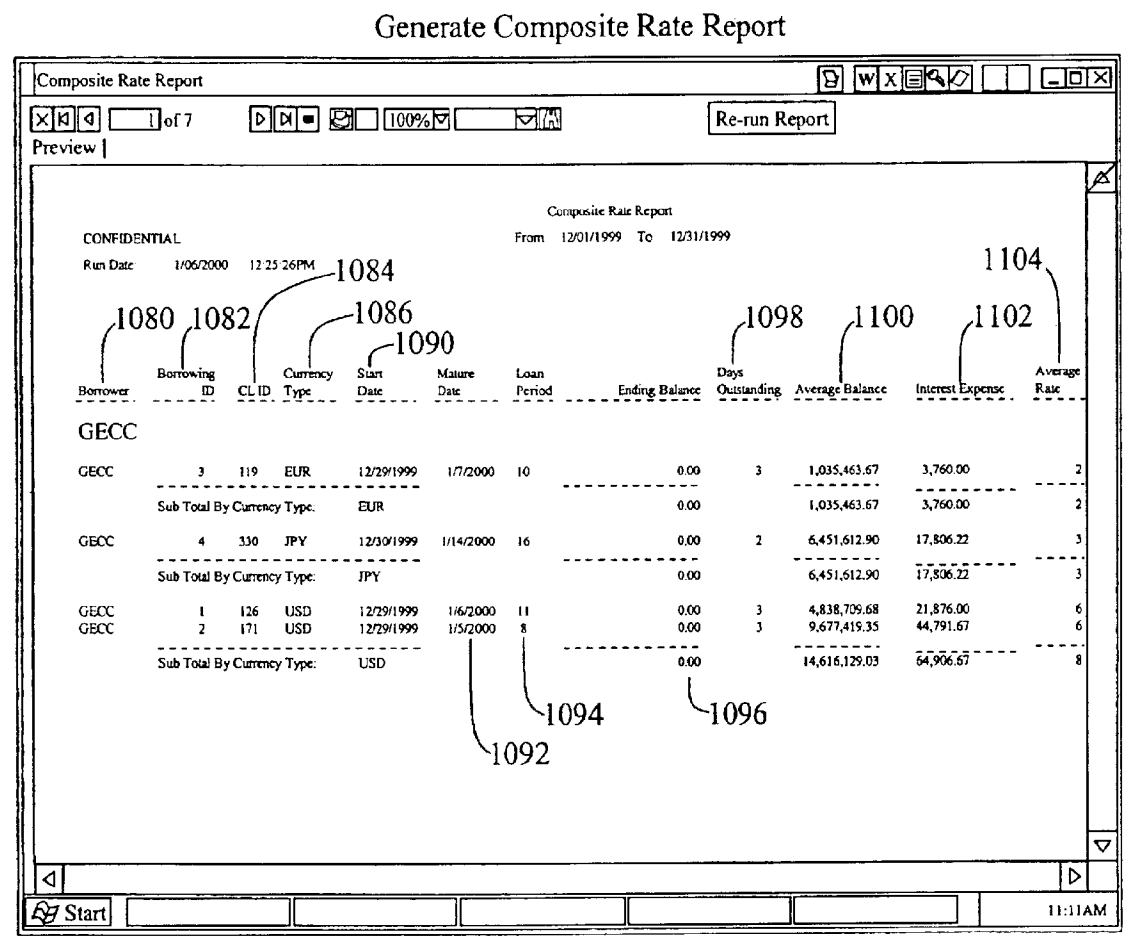

FIG. 32 is an exemplary embodiment of composite rate report 484. Report 484 displays average rate information for each borrowing outstanding during the selected period. It identifies a name of a borrower 1080, a borrowing identification number 1082, credit line identification 1084, a currency type 1086, a start date (a date that funds are available) 1090, a maturity date (which is a due date) 1092, a loan period 1094, an ending balance 1096 which is the outstanding balance in local currency at the end of a report period, number of days outstanding in a report period 1098, and an average balance 1100 including interest expense 1102 and average rate 1104.

Credit Line Module 150, Borrowing Module 160 as well as Journal Entry Module 170, as disclosed in FIGS. 6, 7, 8 and 9 also generate other reports. These reports can be rearranged in different ways to meet the expectations of the management and to implement proper controls in the business operations.

While the invention has been described in terms of various specific embodiments, those skilled in the art will recognize that the invention can be practiced with modification within the spirit and scope of the claims.

What is claimed is:

1. A method for tracking bank credit lines and borrowing against the bank credit lines using a Credit Line System coupled to a centralized database, wherein the bank credit lines are established between a borrower and at least one bank, said method comprising the steps of:

tracking credit ratings of a first bank;

requesting the first bank to establish a line of credit for the borrower;

accessing a centralized database to obtain and maintain information regarding the established line of credit including the credit ratings of the first bank, a total credit line, an amount drawn on the established line of credit, an interest rate on the established line of credit, and commitment fees associated with the established line of credit;

automatically transmitting domestic and international wire information for cash movement to the first bank to facilitate repayment by the borrower of the amount drawn on the established line of credit and to ensure timely payment by the borrower of commitment fees associated with the established line of credit;

monitoring the established line of credit based on the credit ratings of the first bank;

calculating an eligibility factor for the borrower based on information stored in the database, the eligibility factor indicating at least one of a likelihood that the first bank would increase the established line of credit with the borrower and a likelihood that a second bank would establish a new line of credit with the borrower; and posting journal entries to a general ledger of the borrower including borrowings against the established line of credit, repayments made toward the established line of credit, and commitment fees paid for the established line of credit for financial monitoring, reporting and auditing purposes.

2. A method in accordance with claim 1 wherein said step of accessing a centralized database to obtain and maintain information further comprises the steps of:

accessing at least one of current credit line commitments, history and amount available for borrowing from a financial institution; and updating at least one of current credit line commitments, history and amount available for borrowing from the financial institution.

3. A method in accordance with claim 1 wherein said step of accessing a centralized database to obtain and maintain information further comprises the steps of:

accessing at least one of real-time current borrowings, repayments and history for each credit line; and updating at least one of real-time current borrowings, repayments and history for each credit line.

4. A method in accordance with claim 1 wherein said step of posting journal entries to a general ledger further comprises the step of automatically transmitting borrowing journal entries to the general ledger.

5. A method in accordance with claim 1 wherein said step of tracking credit rating of a first bank further comprises the step of tracking credit ratings for any type of financial institution and establishing a line of credit for the borrower with the financial institution.

6. A method in accordance with claim 1 wherein said step of posting journal entries to a general ledger further comprises the step of processing information contained in the centralized database.

7. A method according to claim 3 wherein said step of updating at least one of real-time current borrowings, repayments and history for each credit line further comprises the step of updating real time borrowings in multi-currency.

8. A method according to claim 1 wherein the Credit Line System includes a credit line module, a borrowing module, and a journal entry module, and wherein the method further comprises the steps of:

utilizing the credit line module to generate a plurality of credit line reports including at least one of a credit line management report, a credit line accrual report, a credit line accounting report, a credit line cash management report, a payment report, and a commitment fee report;

utilizing the borrowing module to generate a plurality of borrowing reports including at least one of a borrowing management report, a borrowing accounting report, and a borrowing cash management report; and utilizing the journal entry module to select transactions for recording in the general ledger of the borrower, preview transactions prior to recording create journal entries based on the selected transactions, preview the journal entries, and record the journal entries in the general ledger of the borrower.

9. A method for tracking bank credit lines and borrowing against the bank credit lines using a Credit Line System coupled to a centralized database, wherein the bank credit lines are established between a borrower and at least one bank, said method comprising the steps of:

automatically transmitting domestic and international wire information for cash movement to a first bank to facilitate repayment by the borrower of an amount drawn on the established line of credit and to ensure timely payment by the borrower of commitment fees associated with the established line of credit;

processing information utilizing a credit line module, a borrowing module to maintain borrowings from the bank, and a journal entry module;

monitoring the line of credit established with the first bank based on credit ratings of the first bank;

calculating an eligibility factor for the borrower, the eligibility factor indicating at least one of a likelihood that the first bank would increase the established line of credit with the borrower and a likelihood that a second bank would establish a new line of credit with the borrower;

creating journal entries including borrowings against the established line of credit, repayments toward the established line of credit, and commitment fees paid for the established line of credit; and posting the journal entries to a general ledger of the borrower to record transactions for facilitating preparations of financial statements.

10. A method in accordance with claim 9 wherein said step of processing information further comprises the steps of:

managing information within the modules;

generating a variety of management reports within the modules; and printing the variety of management reports within the modules.

11. A method in accordance with claim 10 wherein said step of managing information further comprises the steps of:

reviewing information contained in the database periodically; and updating information in the centralized database by at least one of adding information to the centralized database, and deleting information as required to keep the system current.

12. A method in accordance with claim 10 wherein said step of generating a variety of management reports further comprises the step of generating a variety of Credit Line Module Reports in a pre-determined format including at least one of a Credit Line Detail Report by Bank, a Credit Line Detail Report by Expiration, a Credit Lines Ranking Report, a Credit Lines Report, a Ratings Report, a Credit Line Accrual Report by Bank Name, a Credit Line Accrual Report by Pay Type, a Credit Line Payment Report, a Gateway ACH Report, a Gateway ACH File which creates ACH fee payment file for submission to the bank wire system, a Gateway Wire which Lists Fed wire fee payment information, and a Gateway Wire File which Creates wire fee payment file for submission to the bank wire system.

13. A method in accordance with claim 10 wherein said step of generating a variety of management reports further comprises the step of generating a variety of Borrowing Module reports in a pre-determined format including at least one of a Borrowing Detail Report by Due Date, a Borrowing Detail Report by Expiration, a Borrowing Detail Report by State/Country, a Borrowing Detail Report by Unused Credit Line, a Borrowing Detail Report by Value Date, a Capacity Available Report by Bank, a Borrowings Repayment Report, a Borrowings Interest Paid Report by Currency, a Borrowing Domestic ACH Report, a Borrowings Domestic Wire Report, a Borrowings Interest Accrual Report in Local Country, and a Composite Rate Report.

14. A method in accordance with claim 10 wherein said step of generating a variety of management reports further comprises the step of generating a variety of Journal Entry Reports in a pre-determined format.

15. A system for tracking bank credit lines and borrowing against the bank credit lines using a Credit Line System, wherein the bank credit lines are established between a borrower and at least one bank, said system comprising:

a server system, a client system configured with a browser, and a centralized database coupled to said server system, said server system connected to said client system, said server system configured to:

track credit ratings of a first bank;

access the centralized database to obtain and maintain information regarding a line of credit established between the borrower and the first bank including the credit ratings of the first bank, a total credit line, an amount drawn on the established line of credit, an interest rate on the established credit line, and commitment fees associated with the established line of credit;

automatically transmit domestic and international wire information for cash movement to the first bank to facilitate repayment by the borrower of the amount drawn on the established line of credit and to ensure timely payment by the borrower of commitment fees associated with the established line of credit;

monitor the established line of credit based on the credit ratings of the first bank;

calculate an eligibility factor for the borrower based on information stored in the database, the eligibility factor indicating at least one of a likelihood that the first bank would increase the established line of credit with the borrower and a likelihood that a second bank would establish a new line of credit with the borrower; and post journal entries to a general ledger of the borrower including borrowings against the established line of credit, repayments made toward the established line of credit, and commitment fees paid for the established line of credit for financial monitoring, reporting and auditing purposes.

16. A system in accordance with claim 15 wherein said server system further configured to:

access at least one of current credit line commitments, history and amount available for borrowing from a financial institution; and update at least one of current credit line commitments, history and amount available for borrowing from the financial institution.

17. A system in accordance with claim 15 wherein said server system further configured to:

access at least one of real-time current borrowings, repayments and history for each credit line; and update at least one of real-time current borrowings, repayments and history for each credit line.

18. A system in accordance with claim 15 wherein said server system further configured to automatically transmit borrowing journal entries to the general ledger.

19. A system in accordance with claim 15 wherein said server system further configured to track credit ratings of any financial institution.

20. A system in accordance with claim 15 wherein said server system further configured to process information contained in the centralized database.

21. A system in accordance with claim 15 wherein said server system further configured to update real time borrowings in multi-currency.

22. A system in accordance with claim 15 wherein said server system further configured to borrow under the credit line.

23. A system for tracking bank credit lines and borrowing against the bank credit lines using a Credit Line System, wherein the bank credit lines are established between a borrower and at least one bank, said system comprising:

a server system, a client system configured with a browser, and a centralized database coupled to said server system, said server system connected to said client system, said server system configured to:

automatically transmit domestic and international wire information for cash movement to a first bank to facilitate repayment by the borrower of an amount drawn on the established line of credit and to ensure timely payment by the borrower of commitment fees associated with the established line of credit;

monitor the line of credit established with the first bank based on the credit ratings of the first bank;

calculate an eligibility factor for the borrower based on information stored in the database, the eligibility factor indicating at least one of a likelihood that the first bank would increase the established line of credit with the borrower and a likelihood that a second bank would establish a new line of credit with the borrower; and process information contained in the centralized database utilizing modules comprised of:
a credit line module to maintain credit lines;
a borrowing module to maintain borrowings from the bank; and
a journal entry module, said journal entry module integrated with the credit line module and the borrowing module to process information to create journal entries including borrowings against the established line of credit, repayments made toward the established line of credit, and commitment fees paid for the established line of credit, and post the journal entries to a general ledger of the borrower for facilitating preparations of financial statements.

24. A system in accordance with claim 23 wherein said server system further configured to:

manage information within the modules;
generate a variety of management reports; and
print the variety of management reports.

25. A system in accordance with claim 23 wherein said server system further configured to:

review information contained in the database periodically; and
update information in the centralized database by at least one of adding information to the centralized database, and deleting information as required to keep the system current.

26. A system in accordance with claim 23 wherein said server system further configured to generate a variety of Credit Line Module Reports in a pre-determined format including at least one of a Credit Line Detail Report by Bank, a Credit Line Detail Report by Expiration, a Credit Lines Ranking Report, a Credit Lines Report, a Ratings Report, a Credit Line Accrual Report by Bank Name, a Credit Line Accrual Report by Pay Type, a Credit Line Payment Report, a Gateway ACH Report, a Gateway ACH File which creates ACH fee payment file for submission to the bank wire system, a Gateway Wire which Lists Fed wire fee payment information, and a Gateway Wire File which Creates wire fee payment file for submission to the bank wire system.

27. A system in accordance with claim 23 wherein said server system further configured to generate a variety of Borrowing Module reports in a pre-determined format including at least one of a Borrowing Detail Report by Due Date, a Borrowing Detail Report by Expiration, a Borrowing Detail Report by State/Country, a Borrowing Detail Report by Unused Credit Line, a Borrowing Detail Report by Value Date, a Capacity Available Report by Bank, a Borrowings Repayment Report, a Borrowings Interest Paid Report by Currency, a Borrowing Domestic ACH Report, a Borrowings Domestic Wire Report, a Borrowings Interest Accrual Report in Local Currency, and a Composite Rate Report.

28. A system in accordance with claim 23 wherein said server system further configured to generate a variety of Journal Entry Reports in a pre-determined format.

29. A system in accordance with claim 23 wherein said server system further configured to establish a communication link with the client system, and authenticate the client system.

30. A system in accordance with claim 23 wherein said server system further configured to link with a client system by at least one of a wide area network, a local area network.

31. A computer program embodied on a computer readable medium for tracking bank credit lines and borrowing against the bank credit lines using a Credit Line System, the Credit Line System which includes a server system, a client system configured with a browser, and a centralized database coupled to the server system, the server system connected to the client system, said computer program comprising:

a code segment to automatically transmit domestic and international wire information for cash movement to a first bank to facilitate repayment by the borrower of an amount drawn on the established line of credit and to ensure timely payment by the borrower of commitment fees associated with the established line of credit;

a code segment to process information contained in the centralized database utilizing a credit line module to maintain credit lines;

a code segment to maintain borrowings against a credit line with the bank utilizing a borrowing module;

a code segment to monitor the line of credit established with the first bank based on the credit ratings of the first bank;

a code segment to calculate an eligibility factor for the borrower based on information stored in the database, the eligibility factor indicating at least one of a likelihood that the first bank would increase the established line of credit with the borrower and a likelihood that a second bank would establish a new line of credit with the borrower; and a code segment to process journal entries including journal entries reflecting borrowings against the credit line, repayments made toward the established line of credit, and commitment fees paid for the credit line by utilizing a journal entry module, the journal entry module integrated with the credit line module and the borrowing module to process information to create borrowing journal entries and post the borrowing journal entries to a general ledger of the borrower for facilitating preparations of financial statements.

32. A computer program embodied on a computer readable medium for tracking bank credit lines and borrowing against the bank credit lines using a Credit Line System, comprising:

a code segment that tracks credit ratings of a first bank;

a code segment that accesses a centralized database to obtain and maintain information regarding a line of credit established with the bank for the borrower including credit ratings of the first bank, a total credit line, an amount drawn on the established line of credit, an interest rate on the established credit line, and commitment fees associated with the established line of credit;

a code segment that automatically transmits domestic and international wire information for cash movement to a first bank to facilitate repayment by the borrower of the amount drawn on the established line of credit and to ensure timely payment by the borrower of commitment fees associated with the established line of credit;

a code segment that monitors the established line of credit with the first bank based on credit ratings of the first bank;

a code segment that calculates an eligibility factor for the borrower based on information stored in the centralized database, the eligibility factor indicating at least one of a likelihood that the first bank would increase the established line of credit with the borrower and a likelihood that a second bank would establish a new line of credit with the borrower; and a code segment that posts borrowing journal entries including journal entries reflecting borrowings against the credit line, repayments made toward the established line of credit, and commitment fees paid for the credit line to a general ledger of the borrower for financial monitoring, reporting and auditing purposes.

33. The computer program as recited in claim 32 further comprising:

a code segment that accesses at least one of current credit line commitments, history and amount available for borrowing from a financial institution; and a code segment that updates at least one of current credit line commitments, history and amount available for borrowing from the financial institution.

34. The computer program as recited in claim 32 further comprising:

a code segment that accesses at least one of real-time current borrowings, repayments and history for each credit line; and a code segment that updates at least one of real-time current borrowings, repayments and history for each credit line.

35. The computer program as recited in claim 32 further comprising a code segment that transmits borrowing journal entries to the general ledger.

36. The computer program as recited in claim 32 further comprising a code segment that tracks credit ratings for any type of financial institution.

37. The computer program as recited in claim 32 further comprising a code segment that processes information contained in the database.

38. The computer program as recited in claim 32 further comprising a code segment that updates real time borrowings in multi-currency.

39. The computer program as recited in claim 32 further comprising a code segment that borrows under the credit line established line of credit.

40. The computer program as recited in claim 32 further comprising a code segment that generates a variety of Credit Line Module Reports in a pre-determined format including at least one of a Credit Line Detail Report by Bank, a Credit Line Detail Report by Expiration, a Credit Lines Ranking Report, a Credit Lines Report, a Ratings Report, a Credit Line Accrual Report by Bank Name, a Credit Line Accrual Report by Pay Type, a Credit Line Payment Report, a Gateway ACH Report, a Gateway ACH File which creates ACH fee payment file for submission to the bank wire system, a Gateway Wire which Lists Fed wire fee payment information, and a Gateway Wire File which Creates wire fee payment file for submission to the bank wire system.

41. The computer program as recited in claim 32 further comprising a code segment that generates a variety of Borrowing Module reports in a pre-determined format including at least one of a Borrowing Detail Report by Due Date, a Borrowing Detail Report by Expiration, a Borrowing Detail Report by State/Country, a Borrowing Detail Report by Unused Credit Line, a Borrowing Detail Report by Value Date, a Capacity Available Report by Bank, a Borrowings Repayment Report, a Borrowings Interest Paid Report by Currency, a Borrowing Domestic ACH Report, a Borrowings Domestic Wire Report, a Borrowings Interest Accrual Report in Local Currency, and a Composite Rate Report.

42. The computer program as recited in claim 32 further comprising a code segment that generates a variety of Journal Entry Reports in a pre-determined format.

43. The computer program as recited in claim 32 further comprising a code segment that generates a journal entry file in a predetermined format for posting to a general ledger.

44. The computer program as recited in claim 32 wherein the data is received from the user via a graphical user interface.

* * * * *